(12) United States Patent  (10) Patent No.: US 8,727,781 B2
Dohring et al.  (45) Date of Patent: *May 20, 2014

(54) ONLINE EDUCATIONAL SYSTEM WITH MULTIPLE NAVIGATIONAL MODES

(75) Inventors: Doug Dohring, Glendale, CA (US); William McCaffrey, Glendale, CA (US); Stephanie Yost, Glendale, CA (US); David Hendry, La Crescenta, CA (US); Lee Borth, Sunland, CA (US)

(73) Assignee: Age of Learning, Inc., Glendale, CA (US)

( * ) Notice: Subject to any disclaimer, the term of this patent is extended or adjusted under 35 U.S.C. 154(b) by 407 days.

This patent is subject to a terminal disclaimer.

(21) Appl. No.: 12/946,570

(22) Filed: Nov. 15, 2010

(65) Prior Publication Data

US 2012/0122061 A1    May 17, 2012

(51) Int. Cl.
*G09B 19/06* (2006.01)
*G09B 25/00* (2006.01)

(52) U.S. Cl.
USPC .......................................... 434/157; 434/365

(58) Field of Classification Search
USPC ......... 434/118, 156, 157, 169, 308, 309, 317, 434/365, 428, 430
See application file for complete search history.

(56) References Cited

U.S. PATENT DOCUMENTS

| 5,558,520 | A | * | 9/1996 | Werzberger .................. 434/317 |
| 5,800,182 | A |  | 9/1998 | Carson et al. |
| 5,904,485 | A |  | 5/1999 | Siefert |
| 6,149,441 | A |  | 11/2000 | Pellegrino et al. |
| 6,353,447 | B1 | * | 3/2002 | Truluck et al. ................ 715/733 |
| 6,364,666 | B1 |  | 4/2002 | Jenkins et al. |
| 6,408,315 | B1 |  | 6/2002 | McManus et al. |
| 6,456,230 | B2 |  | 9/2002 | Schwartz et al. |
| 6,563,514 | B1 |  | 5/2003 | Samar |
| 6,585,519 | B1 |  | 7/2003 | Jenkins et al. |
| 6,755,659 | B2 |  | 6/2004 | LoSasso et al. |
| 6,775,518 | B2 |  | 8/2004 | Norcott et al. |
| 6,827,578 | B2 |  | 12/2004 | Krebs et al. |
| 6,877,987 | B2 |  | 4/2005 | Kulack |
| 6,928,260 | B2 |  | 8/2005 | Betz et al. |

(Continued)

FOREIGN PATENT DOCUMENTS

| JP | 2010-160556 | 7/2010 |
| KR | 10-2000-005844 | 9/2000 |

(Continued)

OTHER PUBLICATIONS

PCT/US2011/060850 International Search Report dated May 14, 2012.

(Continued)

*Primary Examiner* — Robert J Utama
*Assistant Examiner* — Sadaruz Zaman
(74) *Attorney, Agent, or Firm* — Wilson, Sonsini, Goodrich & Rosati

(57) ABSTRACT

A web-based educational system comprising at least one area of skill, interest, or expertise, a plurality of activities associated with each area of skill, interest, or expertise, and at least three navigational modes, wherein the navigational modes comprise a sequenced navigational mode, a guided navigational mode, and an independent navigational mode. Optionally, the learner can switch between available navigational modes.

53 Claims, 7 Drawing Sheets

(56) References Cited

U.S. PATENT DOCUMENTS

| | | | |
|---|---|---|---|
| 6,985,913 | B2 | 1/2006 | Murata |
| 6,988,138 | B1 | 1/2006 | Alcorn et al. |
| 7,014,467 | B2 | 3/2006 | Krebs et al. |
| 7,043,193 | B1 | 5/2006 | Vashi et al. |
| 7,085,707 | B2 * | 8/2006 | Milner ............... 704/5 |
| 7,153,140 | B2 | 12/2006 | Ivanir et al. |
| 7,210,938 | B2 | 5/2007 | Packard et al. |
| 7,286,793 | B1 | 10/2007 | Miele |
| 7,631,254 | B2 | 12/2009 | Layard et al. |
| 2001/0046658 | A1 | 11/2001 | Wasowicz |
| 2001/0053513 | A1 | 12/2001 | Corn et al. |
| 2002/0001791 | A1 | 1/2002 | Wasowicz et al. |
| 2002/0055089 | A1 | 5/2002 | Scheirer |
| 2002/0076685 | A1 | 6/2002 | Ueno |
| 2002/0164563 | A1 | 11/2002 | Wasowicz et al. |
| 2003/0036045 | A1 | 2/2003 | Vivian |
| 2003/0124500 | A1 * | 7/2003 | Frankenberry et al. ....... 434/311 |
| 2003/0152901 | A1 | 8/2003 | Altenhofen et al. |
| 2004/0076931 | A1 | 4/2004 | Rogan et al. |
| 2004/0126750 | A1 | 7/2004 | Theilmann et al. |
| 2005/0019741 | A1 | 1/2005 | Kim |
| 2005/0069849 | A1 | 3/2005 | McKinney et al. |
| 2005/0164154 | A1 | 7/2005 | Solomon |
| 2005/0277100 | A1 | 12/2005 | Bagley et al. |
| 2006/0105313 | A1 * | 5/2006 | Mansfield et al. ............ 434/350 |
| 2006/0204942 | A1 | 9/2006 | Kimball |
| 2007/0020604 | A1 | 1/2007 | Chulet |
| 2007/0088712 | A1 | 4/2007 | Watson et al. |
| 2007/0112703 | A1 | 5/2007 | Gu et al. |
| 2007/0122788 | A1 | 5/2007 | Stevens, Jr. |
| 2007/0166690 | A1 | 7/2007 | Johnson |
| 2007/0172809 | A1 | 7/2007 | Gupta |
| 2007/0196807 | A1 | 8/2007 | Packard et al. |
| 2007/0238077 | A1 | 10/2007 | Strachar |
| 2007/0298383 | A1 | 12/2007 | Jenkins et al. |
| 2008/0020367 | A1 | 1/2008 | Jessop et al. |
| 2008/0057482 | A1 | 3/2008 | Snyder et al. |
| 2008/0229182 | A1 | 9/2008 | Hendricks et al. |
| 2008/0254434 | A1 | 10/2008 | Calvert |
| 2008/0254438 | A1 | 10/2008 | Woolf et al. |
| 2009/0011397 | A1 | 1/2009 | Writer |
| 2009/0035733 | A1 | 2/2009 | Meitar et al. |
| 2009/0047650 | A1 | 2/2009 | Leuck et al. |
| 2009/0094540 | A1 | 4/2009 | Gray et al. |
| 2009/0148824 | A1 | 6/2009 | Argott |
| 2009/0162822 | A1 | 6/2009 | Strachan et al. |
| 2009/0167685 | A1 | 7/2009 | Wrubel et al. |
| 2009/0239202 | A1 | 9/2009 | Stone |
| 2009/0291426 | A1 | 11/2009 | Polivka |
| 2009/0317778 | A1 * | 12/2009 | Oberman ...................... 434/169 |
| 2010/0075288 | A1 * | 3/2010 | Sareday ....................... 434/322 |
| 2010/0081115 | A1 * | 4/2010 | Harding et al. .............. 434/157 |
| 2010/0081116 | A1 * | 4/2010 | Barasch et al. ............... 434/252 |
| 2011/0020781 | A1 | 1/2011 | Yang |
| 2011/0065082 | A1 * | 3/2011 | Gal et al. ..................... 434/365 |
| 2011/0207107 | A1 | 8/2011 | Cancilliari et al. |
| 2012/0122066 | A1 | 5/2012 | Dohring et al. |
| 2012/0122067 | A1 | 5/2012 | Dohring et al. |
| 2012/0129144 | A1 | 5/2012 | Singh |
| 2012/0149001 | A1 | 6/2012 | Dohring et al. |
| 2012/0231437 | A1 | 9/2012 | Fakhrai |
| 2013/0130217 | A1 | 5/2013 | Dohring et al. |

FOREIGN PATENT DOCUMENTS

| | | |
|---|---|---|
| KR | 10-2001-0008053 | 2/2001 |
| KR | 10-2001-0106820 | 12/2001 |
| KR | 10-2002-0034378 | 5/2002 |
| KR | 10-2002-0092556 | 12/2002 |
| KR | 10-2003-0055183 | 7/2003 |
| KR | 10-2003-0070878 | 9/2003 |
| KR | 10-2007-0113355 | 11/2007 |
| KR | 10-2008-0006063 | 1/2008 |
| KR | 10-2009-0061535 | 6/2009 |

OTHER PUBLICATIONS

PCT/US2011/060853 International Search Report dated May 17, 2012.
PCT/US2011/060848 International Search Report dated Jun. 14, 2012.
PBS Kids website, http://pbskids.org/ screen capture, Accessed Oct. 13, 2010.
Starfall website, http://more.starfall.com/ screen capture, Accessed Oct. 13, 2010.
Sesame St. website, http://www.sesamestreet.org/ screen capture, Accessed Oct. 13, 2010.
Disney Preschool website, http://preschooltime.go.com/ screen capture, Accessed Oct. 13, 2010.
Nick Jr. Boost website, http://www.nickjrboost.com/ screen capture, Accessed Oct. 13, 2010.
E-learning for Kids website, http://www.e-learningforkids.org/ screen capture, Accessed Oct. 13, 2010.
Fun School website, http://funschool.kaboose.com/ screen capture, Accessed Oct. 13, 2010.
Webkinz website, http://www.webkinz.com/ screen capture, Accessed Oct. 13, 2010.
Dreambox Learning website, http://www.dreambox.com/ screen capture, Accessed Oct. 13, 2010.
Time 4 Learning website, http://www.time4learing.com/ screen capture, Accessed Oct. 13, 2010.
Zoodles website, http://www.zoodles.com/home/marketing screen capture, Accessed Oct. 13, 2010.
IXL website, http://www.ixl.com/ screen capture, Accessed Oct. 13, 2010.
Learning Planet website, http://www.learningplanets.com/ screen capture, Accessed Oct. 13, 2010.
Children's Progress website, http://childrensprogress.com/ screen capture, Accessed Oct. 13, 2010.
Clever Island website, http://www.cleverisland.com/ screen capture, Accessed Oct. 13, 2010.
I Know That website, http://www.iknowthat.com/FT/index.html screen capture, Accessed Oct. 13, 2010.
Up to Ten website, http://uptoten.com/ screen capture, Accessed Oct. 13, 2010.
BrainPOP website, http://www.brainpop.com/ screen capture, Accessed Oct. 13, 2010.
Gamequarium website, http://www.gamequarium.com/ screen capture, Accessed Oct. 13, 2010.
Jumpstart website, http://www.jumpstart.com/ screen capture, Accessed Oct. 13, 2010.
K5 Stars website, http://www.k5stars.com/ screen capture, Accessed Oct. 13, 2010.
Quiz Tree website, http://www.quiz-tree.com/ screen capture, Accessed Oct. 13, 2010.
Fish Smarty website, http://www.fishsmarty.com/ screed capture, Accessed Oct. 13, 2010.
Fun Brain website, http:/www.funbrain.com/ screen capture, Accessed Oct. 13, 2010.
BrainPOP Mobile Application website, http://www.brainpop.com/apps/about/ screen capture, Accessed Nov. 30, 2010.
BrainPOP Featured Movie Mobile Application on Apple® iTunes® App Store, http://itunes.apple.com/us/app/brainpop-featured-movie/id364894352?mt=8 screen capture, Accessed Nov. 30, 2010.
Starfall Education Mobile Application website, http://more.starfall.com/info/apps/starfall-education.php screen capture, Accessed Nov. 30, 2010.
Starfall ABCs Mobile Application on Apple® iTunes® App Store, http://itunes.apple.com/us/app/starfall-abcs/id395623983?mt=8 screen capture, Accessed Nov. 30, 2010.
Berenstain Bears and the Golden Rule Mobile Application on Apple® iTunes® App Store, http://itunes.apple.com/us/app/the-berenstain-bears-golden/id392186848?mt=8 screen capture, Accessed Dec. 2, 2010.
Zoo You Later-Monkey Business Mobile Application on Apple® iTunes® App Store, http://itunes.apple.com/us/app/zoo-you-later-monkey-business/id373017053?mt=8 screen capture, Accessed Dec. 2, 2010.

(56) References Cited

OTHER PUBLICATIONS

Dr. Seuss's ABC Mobile Application on Apple® iTunes® App Store, http://itunes.apple.com/us/app/dr.-seusss-abc/id354855128?mt=8 screen capture, Accessed Dec. 2, 2010.

The Velveteen Rabbit, http://itunes.apple.com/us/app/the-velveteen-rabbit/id395279598?mt=8 screen capture, Accessed Dec. 2, 2010.

Mrs. P's Reader Challenge Mobile Application on Apple® iTunes® App Store, http://itunes.apple.com/us/app/mrs-p/id398450178?mt=8 screen capture, Accessed Dec. 2, 2010.

Miss Spider's Tea Party Mobile Application on Apple® iTunes® App Store, http://itunes.apple.com/us/app/miss-spiders-tea-party-for/id365173247?mt=8 screen capture, Accessed Dec. 2, 2010.

Toy Story Read Along Mobile Application on Apple® iTunes® App Store, http://itunes.apple.com/us/app/toy-story-read-along/id364376920?mt=8 screen capture, Accessed Dec. 2, 2010.

Jack and The Beanstalk Kid's Story Book Mobile Application on Apple® iTunes® App Store, http://itunes.apple.com/us/app/jack-and-the-beanstalk-kids/id387612649?mt=8 screen capture, Accessed Dec. 2, 2010.

One Rainy Day Mobile Application on Apple® iTunes® App Store, http://itunes.apple.com/us/app/one-rainy-day-a-read-along/id396522639?mt=8 screen capture, Accessed Dec. 2, 2010.

Aesop's Fables Audio book Mobile Application on Apple® iTunes® App Store, http://itunes.apple.com/us/app/aesops-fables-for-children/id371850401?mt=8 screen capture, Accessed Dec. 2, 2010.

Sophia Wants to Be . . . A Painter Mobile Application on Apple® iTunes® App Store, http://itunes.apple.com/us/app/sophia-wants-to-be-...-a-painter/id325197608?mt=8 screen capture, Accessed Dec. 2, 2010.

Little Red Riding Hood Mobile Application on Apple® iTunes® App Store, http://itunes.apple.com/us/app/little-red-riding-hood-kids/id329098511?mt=8# screen capture, Accessed Dec. 2, 2010.

The Emperor's New Clothes Mobile Application on Apple® iTunes® App Store, http://itunes.apple.com/us/app/id389589624?mt=8 screen capture, Accessed Dec. 2, 2010.

PCT/US2011/063602 International Search Report mailed Jun. 21, 2012.

U.S. Appl. No. 12/946,538 Non-Final Office Action issued Oct. 15, 2012.

U.S. Appl. No. 12/946,570 Non-Final Office Action dated Oct. 24, 2012.

U.S. Appl. No. 12/963,546 Non-Final Office Action dated Aug. 31, 2012.

PCT/US2011/060848 International Report on Patentability dated May 30, 2013.

U.S. Appl. No. 12/946,538 Final Office Action issued May 8, 2013.

PCT/US2011/060850 International Report on Patentability dated May 30, 2013.

PCT/US2011/060853 International Report on Patentability dated May 30, 2013.

U.S. Appl. No. 12/946,627 Non-Final Office Action dated Apr. 10, 2013.

U.S. Appl. No. 12/963,546 Final Office Action dated Mar. 28, 2013.

PCT/US2012/065940 International Search Report dated May 24, 2013.

PCT/US2011/063602 International Report on Patentability dated Jun. 20, 2013.

U.S. Appl. No. 12/946,627 Final Office Action dated Oct. 21, 2013.

U.S. Appl. No. 13/301,641 Final Office Action dated Oct. 30, 2013.

U.S. Appl. No. 13/301,641 Non-Final Office Action dated Mar. 11, 2014.

\* cited by examiner

ONLINE EDUCATIONAL SYSTEM WITH MULTIPLE NAVIGATIONAL MODES

BACKGROUND OF THE INVENTION

Higher levels of education offer benefits, both intangible and economic, for students and the societies in which they live. Personal benefits can include a feeling of fulfillment, social and economic mobility, and increased quality of life. According to the Census Bureau, over an adult's working life, high school graduates earn an average of $1.2 million; associate's degree holders earn about $1.6 million; and bachelor's degree holders earn about $2.1 million. On a larger scale, countries with high enrollment and graduation rates have grown faster than countries without.

Effective educational experiences are important at all stages of life. Preschool education develops the foundation for children's enduring language, motor, and analytical skills. Primary education helps children achieve basic literacy and numeracy, and establishes foundations in science, mathematics, geography, history, and other social sciences. Secondary education provides adolescents opportunities to learn in areas beyond traditional basic subjects including, foreign languages, advanced math, advanced science, and advanced humanities. Importantly, secondary education also prepares students for the transition to higher education as adults. Higher education provides specialized academic, professional, or vocational training, resulting in award of certificates, diplomas, or academic degrees. In professional life, education enables adults to advance within their career or re-train to support a career change. Even in post-career life, seniors enjoy the benefits of education in pursuit of hobbies and personal interests.

Regardless of stage of life or subject matter, education often requires learners to navigate large quantities of information. It is challenging for learners to avoid becoming overwhelmed by educational content. To succeed, a learner should be able to effectively find, explore, navigate, and participate in individual learning activities.

SUMMARY OF THE INVENTION

Technology offers educators new opportunities to create powerful learning tools. For example, multimedia provides new ways to interact with learners, such as interactive online educational environments. In such an environment, students can be given flexibility to choose both what they learn and how they learn it. Learners need not be restricted to a single way to navigate, discover, and experience educational content. For these reasons, an effective online educational environment should present a variety of navigational modes, which allows each individual the opportunity to find, explore, navigate, and participate in learning content in an effective way.

Despite the potential for navigational options and flexibility created by technology, current educational websites offer limited navigational modes. The result is often frustrated learners, online educational environments that fail to retain learners, and ineffective online educational experiences. Accordingly, we have identified a long-felt and unmet need for an online educational environment that offers multiple navigational modes including sequenced, guided, and independent modes, and optionally, the ability to switch between available modes.

Disclosed herein are computer-based educational systems, methods of education, and media encoded with computer programs. In some embodiments, the computer-based educational systems are World Wide Web-based. In other embodiments, the computer-based educational systems are based on data storage devices including, by way of non-limiting examples, CD-ROMs, DVDs, flash memory devices, magnetic disk drives, and optical disk drives. In other embodiments, the computer-based educational systems are intranet-based. In still other embodiments, the computer-based educational systems are cloud computing-based.

In some embodiments, the computer-based educational system comprises a digital processing device connected to the Internet and a computer program including executable instructions that create an educational environment. The digital processing device comprises an operating system configured to perform executable instructions, a memory device, a display, a sound output device, and an input device. The computer program includes executable instructions that create an educational environment comprising at least one area of skill, interest, or expertise and a plurality of activities associated with each area of skill, interest, or expertise. In some embodiments, each area of skill, interest, or expertise comprises a plurality of levels. In some embodiments, one or more activities associated with an area of skill, interest, or expertise are available in a language other than English. The educational environment further comprises at least three navigational modes. Optionally, the learner can switch between available navigational modes.

One aspect of the educational environment disclosed herein is a sequenced navigational mode wherein the system presents to the learner a predetermined sequence of more than one activity in one or more areas of skill, interest, or expertise, wherein the learner must complete each preceding activity in the sequence to progress to the next. In some embodiments, an instructional designer selects the sequence of activities. In some embodiments, the sequenced navigational mode includes a software module for optionally removing one or more areas of skill, interest, or expertise from the predetermined sequence of more than one activity. In some embodiments, each step in the predetermined sequence of activities comprises either an activity or a set of alternate activities. In further embodiments, where the next step in a predetermined sequence of activities is a singular activity, the web-based educational system presents the activity to the learner. In further embodiments, where the next step in a predetermined sequence of activities is a set of alternate activities, the web-based educational system presents one activity from among the set of alternate activities to the learner.

In some embodiments the sequenced navigational mode is further characterized by comprising a software module, adapted for use by the learner, for displaying the predetermined sequence of more than one activity in one or more areas of skill, interest, or expertise, wherein the software module is characterized by representing said sequence of more than one activity as a linear succession and representing lessons, comprising groups of activities, as points in the linear succession. In some embodiments, the sequenced navigational mode is further characterized by comprising a software module, adapted for use by the learner, for displaying said lessons, comprising groups of activities, and providing access to the activities, wherein said software module is characterized by representing lessons as a group of selectable activity icons.

Another aspect of the educational environment disclosed herein is a guided navigational mode wherein the educational system presents to the learner one or more activities in one or more areas of skill, interest, or expertise selected by a mentor from among a population of activities to create a subpopulation of activities. In various embodiments, a mentor may select activities in a multitude of ways including, by way of non-limiting examples, by clicking activity icons with a mouse, by tapping activity icons on a touch screen, dragging activity icons and dropping them into a designated area, or by typing the names of activities. In some embodiments, in a guided navigational mode, the learner selects activities from among the subpopulation of activities. In some embodiments, the guided navigational mode is further characterized by comprising a software module, adapted for use by a mentor to the learner, for building lessons by selecting one or more activity icons. In further embodiments, a mentor has the option to sequence the subpopulation of activities. In still further embodiments, a mentor has the option to select and sequence activities by dragging and dropping activity icons. In some embodiments, the guided navigational mode is further characterized by comprising a software module, adapted for use by the learner, for displaying the subpopulation of activities selected by a mentor. In further embodiments, the activities selected by a mentor are displayed in the sequence determined by said mentor or in a sequence aligned to a predetermined sequence.

Another aspect of the educational environment disclosed herein is an independent navigational mode wherein the learner selects activities from among a population of activities. In some embodiments, the completion of an activity selected by the learner in independent navigational mode is the equivalent of completing the same activity in a sequenced or guided navigational mode. In some embodiments, the independent navigational mode is further characterized by the learner freely using a plurality of selectable elements to access the population of activities, wherein said plurality of selectable elements comprises selectable elements to access a desired area of skill, interest, or expertise, selectable elements to access a desired activity type, and selectable elements to access a desired theme.

In some embodiments, the educational environment is substantially in Adobe® Flash®. In some embodiments, the educational environment further comprises a top-level graphic user interface (GUI) characterized by representing a classroom environment. In further embodiments, the classroom environment further includes a representation of an instructor wherein the learner or a mentor to the learner has the option to customize the appearance of the instructor. In other embodiments, the GUI is characterized by representing other environments conducive to learning. In additional embodiments, the educational environment further comprises a glossary of words used in one or more activities.

In some embodiments, the educational system further comprises a software module for monitoring the progress of the learner, wherein said software module includes a visual indicator adapted for use by the learner that displays the percentage of activities completed within a sequence of activities. In some embodiments, the educational system further comprises a software module for monitoring the progress of the learner, wherein said software module includes progress displays adapted for use by the learner or a mentor to the learner. In some embodiments, the progress displays indicate percentage completion of one or more areas of skill, interest, or expertise, percentage completion of one or more levels within each area of skill, interest, or expertise, and completion of each activity associated with each sequence of activities. In further embodiments, the progress displays indicate the number of times each activity has been completed. In additional embodiments, the progress displays indicate performance by metrics such as raw scores or percentages. Some embodiments might also indicate performance by metrics such as grades. In additional embodiments, the progress displays indicate time spent by the learner. In further embodiments, the software module for monitoring the progress of the learner includes printable reports adapted for use by the learner or a mentor to the learner.

In some embodiments, the educational system further comprises a software module adapted for conducting e-commerce transactions. In further embodiments, the e-commerce transactions create subscription-based access to the educational environment. In still further embodiments, the transactions are sales of goods or other services.

The term "learner" as used herein, refers to a person of any age who interacts with an educational system for the purpose of gaining knowledge, insight, or understanding of one or more areas of skill, interest, or expertise or by virtue of having been allowed, asked, or assigned to interact with an educational system.

The term "mentor" as used herein, refers to a person who has an interest in, or responsibility for, facilitating or furthering the educational development of a learner and includes, by way of non-limiting examples, a parent, step-parent, adoptive parent, foster parent, grandparent, guardian, relative, friend, guide, instructor, teacher, or professor, of a learner.

The term "instructional designer" as used herein, refers to any person who designs and/or evaluates learning activities, and grouped sequences of activities, that are elements of an educational system.

The term "instructional plan" as used herein, refers to a plan, conceived by an instructional designer or a mentor to the learner, designed to accomplish one or more specific educational objectives through the mutual reinforcement of individual activities.

DETAILED DESCRIPTION OF THE INVENTION

Figure 1:
FIG. 1 shows a non-limiting example of an educational system including a top-level GUI characterized by representing a metaphor suitable for learning; in this case, a preschool classroom environment.

Existing educational systems do not offer a wide enough variety of navigational modes to accommodate learners' need to effectively find, explore, navigate, and participate in learning activities amid a large quantity of educational information. In fact, none offers multiple navigational modes including sequenced, guided, and independent modes, and optionally, the ability to switch between available modes.

Thus, a primary objective of the systems, methods, and computer programs described herein is to facilitate and enhance the education of a broad spectrum of individuals by utilizing computer technology to offer online educational systems with multiple navigational modes. Advantages of the systems described herein include, but are not limited to, offering at least three navigational modes which include a sequenced navigational mode, a guided navigational mode, and an independent navigational mode. A sequenced navigational mode offers the advantage of a predetermined sequence of activities wherein each activity builds on the educational messages of those prior toward the goal of understanding in an area of skill, interest, or expertise. A guided navigational mode offers the advantage of involvement of a mentor who knows and understands the learner's unique circumstances. An independent navigational mode offers the learner an opportunity to browse and explore learning activities according to their individual interests. In further embodiments, the learner or a mentor to the learner may restrict availability of one or more navigational modes offered by the educational system. Moreover, in some embodiments, the learner has the option to switch between available navigational modes to find the mode that works best for them.

Web-Based Educational System

Described herein, in some embodiments, are web-based educational systems comprising a digital processing device that is connected to the Internet and a computer program including instructions executable by a digital processing system that create an educational environment. The educational environment comprises at least one area of skill, interest, or expertise, a plurality of activities associated with each area of skill, interest, or expertise, and at least three navigational modes. The navigational modes include a sequenced navigational mode, a guided navigational mode, and an independent navigational mode. Optionally, the learner can switch between available navigational modes.

Digital Processing Device

The educational system disclosed herein includes a digital processing device. The digital processing device includes one or more hardware central processing units (CPU) that carry out the device's functions. The digital processing device further comprises an operating system configured to perform executable instructions, a memory device, a display, a sound output device, and an input device. In some embodiments, the digital processing device is connected to the Internet such that it accesses the World Wide Web. In other embodiments, the digital processing device is connected to an intranet. In other embodiments, the digital processing device is connected to a data storage device.

The digital processing device includes an operating system configured to perform executable instructions. The operating system is, for example, software, including programs and data, which manages the device's hardware and provides services for execution of applications. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

The digital processing device includes a memory device. The memory is one or more physical apparatus used to store data or programs on a temporary or permanent basis. In some embodiments, the memory is volatile and requires power to maintain stored information. In some embodiments, the memory is non-volatile and retains stored information when the digital processing device is not powered.

The digital processing device includes a display to send visual information to the learner. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is a plasma display. In other embodiments, the display is a video projector. In still further embodiments, the display is a combination of devices such as those disclosed herein.

The digital processing device includes a sound output device to send auditory information to the learner. In some embodiments, the sound output device is a pair of headphones, earphones, or ear buds. In some embodiments, the sound output device is an electro-acoustic transducer or loudspeaker. In further embodiments, the sound output device is a flat panel loudspeaker, a ribbon magnetic loudspeaker, or a bending wave loudspeaker. In other embodiments, the sound output device is a piezoelectric speaker. In still further embodiments, the sound output device is a combination of devices such as those disclosed herein.

The digital processing device includes an input device to receive information from the learner. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

In accordance with the description herein, suitable digital processing devices include, by way of non-limiting examples, desktop computers, laptop computers, notebook computers, net book computers, set top computers, handheld computers, Internet appliances, mobile smart phones, tablet computers, and video game consoles. Those of skill in the art will recognize that many Internet connected mobile phones are suitable for use in the system described herein. Suitable tablet computers include those with booklet, slate, and convertible configurations, known to those of skill in the art.

Computer Program

The educational system disclosed herein includes a computer program executable by a digital processing system that creates an educational environment. The computer program includes a sequence of instructions, executable in the digital processing device's CPU, written to perform a specified task. In the case of the educational system disclosed herein, the task is to create an educational environment. In some embodiments, the sequence of instructions is delivered to the digital processing system via the World Wide Web. In other embodiments, the sequence of instructions is delivered to the digital processing system via an intranet. In other embodiments, the sequence of instructions is delivered to the digital processing system via a data storage device.

Those of skill in the art will recognize that the computer program may be written in various languages. The computer program may be written in one or more markup languages, style languages, client-side scripting languages, server-side coding languages, or combinations thereof. In some embodiments, the computer program is written to some extent in a markup language such as Hypertext Markup Language (HTML), Extensible Hypertext Markup Language (XHTML), or eXtensible Markup Language (XML). In some embodiments, the computer program is written to some extent in a style language such as Cascading Style Sheets (CSS). In some embodiments, the computer program is written to some extent in a client-side scripting language such as Asynchronous Javascript and XML (AJAX), Flash®, Actionscript, Javascript, or Silverlight®. In some embodiments, the computer program is written to some extent in a server-side coding language such as Active Server Pages (ASP), ColdFusion®, Common Gateway Interface (CGI), Perl, Java™, Hypertext Preprocessor (PHP), Python™, Ruby, Structured Query Language (SQL), mySQL™, Oracle®, or .NET.

The computer program creates an educational environment that includes a GUI. The GUI allows learners to interact with the educational environment through text, hyperlinks, graphical icons and other visual elements, manipulation of graphical elements, auditory elements, and motion elements. In some embodiments, the GUI includes one level of hierarchical organization. In other embodiments, the GUI includes multiple levels of hierarchical organization including, a top-level and one or more sub-levels.

Referring to FIG. 1, in some embodiments the educational system includes a top-level GUI characterized by representing a classroom environment. In some embodiments, the classroom environment is a preschool classroom environment. In other embodiments, the classroom environment is a grade school, middle school, junior high school, or high school classroom environment. In other embodiments, the classroom environment is a university, college, or professional training classroom environment. In further embodiments, the classroom environment further includes a representation of an instructor.

Figure 2:
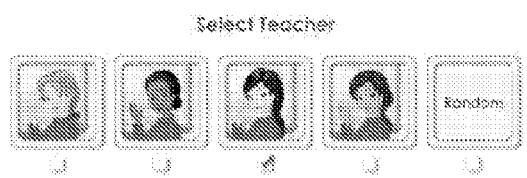
FIG. 2 shows a non-limiting example of software module for customizing a representation of an instructor; in this case, a software module for customizing the appearance of the instructor.

Referring to FIG. 2, in still further embodiments, the learner or a mentor to the learner has the option to customize the appearance of the instructor. In some embodiments the learner or a mentor to the learner has the option to customize features of the instructor including, by way of non-limiting examples, gender, race, ethnicity, culture, age, size, or clothing in order to provide a representation familiar to the learner.

In some embodiments, the educational system includes a top-level GUI characterized by representing other metaphors suitable for learning including, by way of non-limiting examples, natural settings, academic settings, entertainment settings, retail settings, and professional settings. In some embodiments, natural settings include, by way of non-limiting examples, zoos, farms, parks, beaches, mountains, deserts, oceans, lakes, jungles, tunnels, caves, undersea environments, extraterrestrial environments, arctic and Antarctic environments, and gardens. In some embodiments, academic settings include, by way of non-limiting examples, campuses, scientific laboratories, art studios, music conservatories, computer laboratories, observatories, planetariums, and libraries. In some embodiments, entertainment settings include, by way of non-limiting examples, movies, plays, puppet shows, sporting events, amusement parks, carnivals, and theme parks. In some embodiments, retail settings include, by way of non-limiting examples, shopping malls, stores, and markets. In some embodiments, professional settings include, by way of non-limiting examples, kitchens, garages, machine shops, wood working shops, metal working shops, medical facilities, courtrooms, boardrooms, conference rooms, trade shows, trade conferences, interview rooms, and banks.

In some embodiments, the educational system further includes a software module adapted for conducting e-commerce transactions. In view of the disclosure provided herein, the software module is created by techniques known to those of skill in the art using machines, software, and languages known to the art. In some embodiments, the e-commerce transactions provide monthly subscription-based access to the educational environment. In some embodiments, the e-commerce transactions provide weekly, quarterly, or yearly subscription-based access to the educational environment. In some embodiments, the e-commerce transactions are sales of other services to the learner or a mentor to the learner. In some embodiments, the e-commerce transactions are sales of goods to the learner or a mentor to the learner. In other embodiments, the e-commerce transactions are sales of services, such as advertising services, to third parties.

Area of Skill, Interest, or Expertise

The educational system disclosed herein includes at least one area of skill, interest, or expertise. An area of skill, interest, or expertise may include informal topics such as those relating to hobbies and personal interests. A hobby is an activity or interest usually undertaken for pleasure or relaxation. An area of skill, interest, or expertise may also include more formal subjects addressing academic or professional topics. A subject is a category of learning that a student may typically undertake in an educational institution. In some embodiments, subjects comprise topics addressing one category of learning. In other embodiments, subjects comprise interdisciplinary topics addressing more than one category of learning. An area of skill, interest, or expertise may also include topics such as those relating to professional skills. Some professional skills are not taught as formal subjects, nor are they hobbies undertaken for relaxation, rather they are topics undertaken for business purposes.

In some embodiments, one or more areas of skill, interest, or expertise are selected from hobbies and personal interests including, by way of non-limiting examples, animal husbandry, animal breeding, antiquing, artistic endeavors, automobile restoration, automobile repair, bird watching, collecting, cooking, creating dioramas, fish keeping, fishing, flower arranging, game playing, gardening, horticulture, investing, knitting, origami, outdoor recreation, performing arts, poetry, quilting, reading, sewing, scale modeling, scrapbooking, wine tasting, writing, and yoga. In some embodiments, artistic endeavors include endeavors such as drawing, glass blowing, painting, sculpting, photography, and pottery. In some embodiments, collecting includes collecting art, coins, dolls, figurines, stamps, spoons, sports cards, and toys. In some embodiments, outdoor recreation includes activities such as backpacking, bicycling, canoeing, caving, climbing, hiking, running, snow sports, and water sports. In some embodiments, performing arts include activities such as acting, dancing, singing, juggling, magic, and playing musical instruments. In some embodiments, reading includes reading materials such as books, comics, magazines, and newspapers. In some embodiments, scale modeling includes subject matter such as automobiles, planes, ships, and trains.

In some embodiments, one or more areas of skill, interest, or expertise are selected from basic subjects including, by way of non-limiting examples, reading and mathematics. In further embodiments, the subjects include one or more basic topics including, by way of non-limiting examples, letters, phonics, word families, sight words, numbers, and shapes.

In some embodiments, one or more areas of skill, interest, or expertise are selected from preschool subjects including, by way of non-limiting examples, language arts, mathematics, social studies, science, music, art, and additional languages. In further embodiments, the subjects include one or more preschool topics including, by way of non-limiting examples, citizenship, colors, computer skills, drawing, ethics, geography, music, physical education, poetry, reading, sign language, Spanish, spelling, and U.S. history.

In some embodiments, one or more areas of skill, interest, or expertise are selected from grade school subjects including, by way of non-limiting examples, language arts, mathematics, social studies, science, music and other performing arts, visual arts, additional languages, health, fitness and sports, and information technology. In further embodiments, the subjects include one or more grade school topics including, by way of non-limiting examples, biology, chemistry, citizenship, composition, computer skills, drawing, earth science, ethics, geography, grammar, physical education, poetry, pre-algebra, reading, sign language, spelling, U.S. government, U.S. history, and writing.

In some embodiments, one or more areas of skill, interest, or expertise are selected from middle school subjects including, by way of non-limiting examples, language arts, mathematics, social studies, science, music and other performing arts, visual arts, additional languages, health, fitness and sports, and information technology. In further embodiments, the subjects include one or more middle school topics including, by way of non-limiting examples, algebra, American literature, biology, chemistry, composition, computer skills, drawing, earth science, ethics, geography, geometry, grammar, journalism, photography, physical education, poetry, pre-algebra, reading, spelling, U.S. government, U.S. history, world history, and writing.

In some embodiments, one or more areas of skill, interest, or expertise are selected from high school subjects including, by way of non-limiting examples, language arts, mathematics, social studies, science, music and other performing arts, visual arts, additional languages, health, fitness and sports, and information technology. In further embodiments, the subjects include one or more high school topics including, by way of non-limiting examples, U.S. history, U.S. government, world history, European history, economics, geography, psychology, sociology, anthropology, philosophy, biology, ecology, anatomy, physiology, chemistry, physics, earth science, astronomy, algebra, statistics, geometry, calculus, trigonometry, grammar, spelling, writing, American literature, European literature, English literature, world literature, composition, poetry, drawing, painting, photography, film, theatre, journalism, computer skills, computer science, computer programming, business, physical education, and sign language.

In some embodiments, one or more areas of skill, interest, or expertise are selected from higher education subjects including, by way of non-limiting examples, language arts, mathematics, social studies, science, music and other performing arts, visual arts, additional languages, health, fitness and sports, and information technology. In further embodiments, the subjects include one or more higher education topics including, by way of non-limiting examples, U.S. history, U.S. government, world history, European history, economics, macroeconomics, microeconomics, psychology, sociology, anthropology, philosophy, law, political science, education, urban studies, women's studies, biology, botany, ecology, environmental studies, anatomy, physiology, virology, pharmacology, cell biology, molecular biology, microbiology, genetics, medicine, neuroscience, chemistry, organic chemistry, biochemistry, physical chemistry, biophysics, physics, earth science, astronomy, astrophysics, algebra, statistics, geometry, calculus, trigonometry, electrical engineering, civil engineering, mechanical engineering, chemical engineering, writing, American literature, European literature, English literature, world literature, composition, poetry, music theory, religion, drawing, painting, photography, film, theatre, journalism, computer science, computer programming, business, business administration, accounting, nursing, law enforcement, physical education, and sign language.

In some embodiments, one or more areas of skill, interest, or expertise are selected from language arts topics including, by way of non-limiting examples, phonics, reading, vocabulary, spelling, grammar, writing, composition, public speaking, American literature, world literature, and poetry.

In some embodiments, one or more areas of skill, interest, or expertise are selected from mathematics topics including, by way of non-limiting examples, mathematics, algebra, geometry, calculus, trigonometry, probability, statistics, number theory, applied mathematics, logic, and topology.

In some embodiments, one or more areas of skill, interest, or expertise are selected from social studies topics including, by way of non-limiting examples, political science, law, U.S. government, U.S. history, world history, geography, economics, archaeology, anthropology, sociology, communication, and psychology.

In some embodiments, one or more areas of skill, interest, or expertise are selected from science topics including, by way of non-limiting examples, health, nutrition, biology, ecology, environmental science, meteorology, oceanography, marine biology, hydrology, soil science, botany, anatomy, physiology, virology, pharmacology, cell biology, molecular biology, microbiology, genetics, medicine, pathology, neuroscience, zoology, chemistry, organic chemistry, biochemistry, physical chemistry, materials science, biophysics, physics, optics, earth science, electrical engineering, civil engineering, mechanical engineering, chemical engineering, paleontology astronomy, astrophysics, and computer science.

In some embodiments, one or more areas of skill, interest, or expertise are selected from arts topics including, by way of non-limiting examples, writing, composition, poetry, art, music, music theory, drawing, painting, photography, film, theatre, dance, sculpture, and art history.

In some embodiments, one or more areas of skill, interest, or expertise are selected from languages including, by way of non-limiting examples, English, Spanish, Italian, Portuguese, French, Dutch, Polish, German, Russian, Ukrainian, Mandarin, Wu, Cantonese, Hindi, Punjabi, Bengali, Marathi, Urdu, Arabic, Turkish, Tamil, Farsi, Japanese, Korean, Vietnamese, Thai, Burmese, Malay, Telugu, and Javanese.

In some embodiments, one or more areas of skill, interest, or expertise are selected from health, sports, and fitness topics including, by way of non-limiting examples, health, nutrition, physical education, archery, baseball, basketball, boating, bowling, cheerleading, cricket, cycling, field hockey, football, golf, hiking, ice hockey, lacrosse, martial arts, water polo, rock climbing, roller hockey, rugby, running, skiing, soccer, surfing, swimming, and walking.

In some embodiments, one or more areas of skill, interest, or expertise are selected from information technology topics including, by way of non-limiting examples, computer skills, Internet safety, computer programming, computer networking, and computer science.

In some embodiments, one or more areas of skill, interest, or expertise are selected from professional topics including, by way of non-limiting examples, continuing legal education, continuing medical education, and continuing education for teachers, accountants, tax preparers, physical therapists, occupational therapists, psychologists, nurses, and nurse practitioners.

In some embodiments, one or more areas of skill, interest, or expertise are selected from professional skills including, by way of non-limiting examples, organization, leadership, time management, negotiation, harassment awareness, conflict management, interviewing, and networking.

In some embodiments, one or more areas of skill, interest, or expertise comprise a plurality of levels. In further embodiments, each area of skill, interest, or expertise comprises a plurality of levels. In some of these embodiments, a level comprises educational topics and activities appropriate for a particular developmental stage of a learner. In some embodiments, a level comprises educational topics and activities appropriate for a particular skill level of a learner. In some embodiments, a level comprises educational topics and activities appropriate for a particular educational objective. In other embodiments, a level comprises educational topics and activities appropriate for a particular test or certification. In some of these embodiments, one or more areas of skill, interest, or expertise comprise three, four, five, six, seven, eight, nine, ten, eleven, twelve, or more levels. In one particular embodiment, one or more areas of skill, interest, or expertise comprise six levels. In some embodiments, each area of skill, interest, or expertise comprises three, four, five, six, seven, eight, nine, ten, eleven, twelve, or more levels. In another particular embodiment, each area of skill, interest, or expertise comprises six levels.

Learning Activities

The educational system disclosed herein includes a plurality of activities associated with each area of skill, interest, or expertise. In some embodiments, each activity is substantially related to one or more specific areas of skill, interest, or expertise. In further embodiments, the plurality of activities is interconnected by an instructional plan designed to accomplish one or more specific educational objectives through the mutual reinforcement of individual activities. In some embodiments, an instructional plan interconnects two or more activities associated with a subject in such a way that understanding is built progressively with one or more activities adding to the educational messages of one or more previous activities. In further embodiments, an instructional plan is conceived by an instructional designer. In other embodiments, an instructional plan is conceived by a mentor to the learner.

In some embodiments, one or more activities are selected from informal activities including, by way of non-limiting examples, demonstrations, how-to-articles, how-to-videos, and simulations.

In some embodiments, one or more activities are selected from preschool activities including, by way of non-limiting examples, books, games, puzzles, art, and music.

In some embodiments, one or more activities are selected from K-12 activities including, by way of non-limiting examples, books, games, puzzles, art, music, reading assignments, articles, videos, demonstrations, simulations, quizzes, examinations, worksheets, problem sets, brainstorms, and journals.

In some embodiments, one or more activities are selected from higher education activities including, by way of non-limiting examples, books, reading assignments, lectures, articles, videos, demonstrations, simulations, mock examinations, quizzes, examinations, essays, laboratory experiments, problem sets, brainstorms, and journals.

In some embodiments, one or more activities are selected from professional activities including, by way of non-limiting examples, books, articles, brainstorms, collaborations, group activities, multi-player games, videos, lectures, role-plays, simulations, demonstrations, quizzes, and exams.

In some embodiments, one or more activities are available in a language other than English in order to facilitate the education of non-English speaking learners. In other embodiments, one or more activities are available in a language other than English in order to address a language curriculum. In further embodiments, one or more activities are available in one or more languages including, by way of non-limiting examples, Spanish, Italian, Portuguese, French, Dutch, Polish, German, Russian, Ukrainian, Mandarin, Wu, Cantonese, Hindi, Punjabi, Bengali, Marathi, Urdu, Arabic, Turkish, Tamil, Farsi, Japanese, Korean, Vietnamese, Thai, Burmese, Malay, Telugu, and Javanese.

Figure 3:
FIG. 3 shows a non-limiting example of a glossary of words used in one or more activities included in an educational environment.

Referring to FIG. 3, in some embodiments, the educational system disclosed herein includes a glossary of words used in one or more activities. In further embodiments, the glossary comprises one or more entries, wherein each entry comprises a word, a definition of the word, and the word used in a sentence. In still further embodiments, the entries further comprise audio of the word and its definition read. In still further embodiments, the entries further comprise an image associated with the word to facilitate understanding of the word and its definition. In some embodiments, the glossary includes video associated with the word to facilitate understanding of the word and its definition. In some embodiments, the glossary includes parallel entries for one or more words in a language other than English.

Navigational Modes

The educational system disclosed herein further comprises software modules for offering at least three navigational modes including a sequenced navigational mode, a guided navigational mode, and an independent navigational mode. In view of the disclosure provided herein, the software modules are created by techniques known to those of skill in the art using machines, software, and languages known to the art. A navigational mode includes the set of GUI elements that a learner uses to browse, navigate, and access learning activities and the programming logic that dictates whether such elements are active, how such elements appear, and how such elements function. In some embodiments, a navigational mode also includes tools and features that a learner or a mentor to the learner has the option to use to review, track, display, and report the learner's participation, progress, and performance within the educational system.

Sequenced Learning Mode

In a sequenced navigational mode the educational system presents to the learner a predetermined sequence of more than one activity in one or more areas of skill, interest, or expertise wherein the learner must complete each preceding activity in the sequence to progress to the next activity. In some embodiments, the learner has the option to repeat previously completed activities. In further embodiments, the learner has the option to complete the same activity multiple times. In some embodiments, the sequence of activities is predetermined by an instructional designer. Typically, the sequence of activities is selected such that each activity builds on the educational messages of those prior toward the goal of providing the learner understanding of one or more areas of skill, interest, or expertise. In some embodiments, the sequence of activities is predetermined to prepare the learner for a particular certification or examination. In other embodiments, the sequence of activities is predetermined in accordance with a published educational standard.

In some embodiments, the predetermined sequence of activities is a macro-sequence, wherein lessons, comprising groups of activities, are sequenced within an area of skill, interest, or expertise, a level within an area of skill, interest, or expertise, or a multi-area level. In some embodiments, the predetermined sequence of activities is a micro-sequence, wherein activities are sequenced within a lesson. In some embodiments, the predetermined sequence of activities is both a macro-sequence and a micro-sequence.

In some embodiments, each step in the predetermined sequence of activities comprises either an activity or a set of alternate activities. In further embodiments, where the next step in a predetermined sequence of activities is a singular activity, the web-based educational system presents the activity to the learner. In further embodiments, where the next step in a predetermined sequence of activities is a set of alternate activities, the web-based educational system presents one activity from the set of alternate activities to the learner. In some embodiments, the web-based educational system presents an activity from a set of alternate activities based on, by way of non-limiting examples, the skill level of the learner, the performance of the learner in previously completed activities, input of a mentor to the learner, or the preference of the learner.

In some embodiments, the predetermined sequence of activities is represented in the GUI as a linear succession. In some of these embodiments, the representation provides a visual metaphor, for the benefit of the learner, that will motivate the learner to complete activities in the sequence and will reward the learner for doing so by allowing them to progress in the succession. In some embodiments, the entire linear succession is not visible to the learner in a single view. In some of these embodiments, a portion of the representation of a linear succession is hidden to avoid overwhelming the learner with the scope of the sequence. In further embodiments, the learner has the option to explore the linear succession in parts.

In further embodiments, lessons, comprising groups of activities, are represented as points in the linear succession. In some embodiments, lessons comprise groups of activities in the same area of skill, interest, or expertise. In other embodiments, lessons comprise groups of activities in more than one area of skill, interest, or expertise. In some embodiments, activities within a lesson are further represented as a group of selectable activity icons. In some of these embodiments, the representation displays the activities and provides access to the activities for the benefit of the learner. In some embodiments, the lesson is a micro-sequence and the learner must complete the activities in the predetermined sequence. In such embodiments, the learner must complete each preceding activity in the sequence to progress to the next activity. In some embodiments, the learner has the option to repeat previously completed activities. In further embodiments, the learner has the option to complete the same activity multiple times. In other embodiments, the lesson is not sequenced and the learner is free to complete the activities in any sequence.

In some embodiments, the group of selectable activity icons is represented in the GUI in a defined area to symbolize the interrelationship of the activities and their educational messages within the lesson. In still further embodiments, the current lesson, defined by completion of all activities in prior lessons in the sequence, is highlighted and identified among other points in the linear succession.

Figure 4:
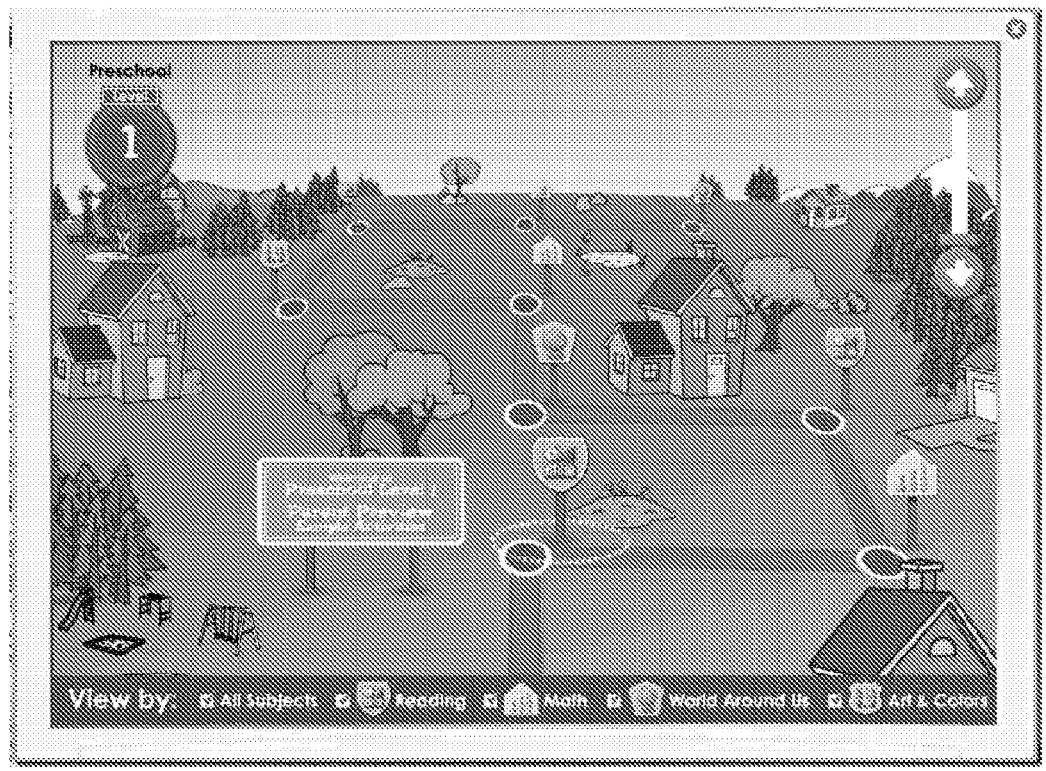
FIG. 4 shows a non-limiting example of a predetermined sequence of activities represented in a GUI as a linear succession; in this case, a path or road, as well as a non-limiting example of lessons represented as points in the linear succession; in this case, waypoints or stops along the path or road.

Referring to FIG. 4, in some embodiments, the linear succession is further represented as a map, path, or road, and said lessons, comprising groups of activities, are further represented as waypoints or stops on the map, path, or road. In further embodiments, the map, path, or road is represented in a larger context including, by way of non-limiting examples, an urban environment, a rural environment, or a natural environment.

Further referring to FIG. 4, in some embodiments, the learner has access to a means of optionally removing one or more categories of activities from the predetermined sequence of activities. In some embodiments, the learner may remove activities associated with one or more areas of skill, interest, or expertise. In some embodiments, the learner may remove activities of one or more types.

Figure 5:
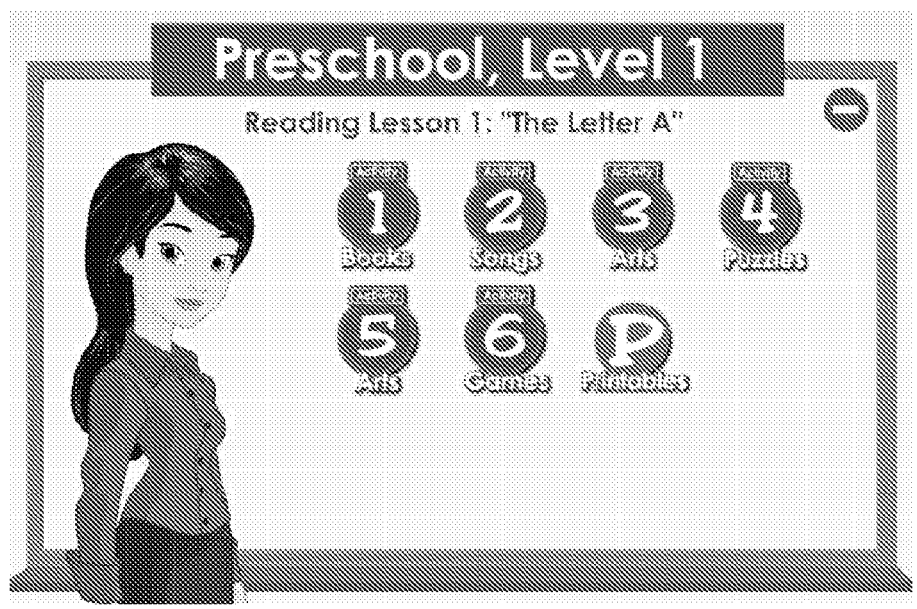
FIG. 5 shows a non-limiting example of a lesson represented in a GUI as a group of selectable activity icons; in this case, a group of selectable activity icons further represented on a whiteboard or bulletin board.

Referring to FIG. 5, in some embodiments, lessons are represented as a group of selectable activity icons which are further represented on a whiteboard, chalkboard, or bulletin board.

In other embodiments, the linear succession is further represented as a line graph, and lessons, comprising groups of activities, are further represented as points on the line graph. In further embodiments, lessons are represented as a group of selectable activity icons which is further represented as on a graph legend.

In still other embodiments, the linear succession is further represented as a football field, and lessons, comprising groups of activities, are further represented as yard markers on the football field. In further embodiments, lessons are represented as a group of selectable activity icons which is further represented as on a scoreboard.

In still other embodiments, the linear succession is further represented as a drawer within a filing cabinet and lessons, comprising groups of activities, are further represented as folders within the drawer. In further embodiments, lessons are represented as a group of selectable activity icons which is further represented as on a file.

In still other embodiments, the linear succession is further represented as an auto racetrack, and lessons, comprising groups of activities, are further represented as mile markers on the auto racetrack. In further embodiments, lessons are represented as a group of selectable activity icons which is further represented as on a billboard.

In some embodiments, the educational system disclosed herein further comprises a software module for monitoring the progress of the learner. In view of the disclosure provided herein, the software module is created by techniques known to those of skill in the art using machines, software, and languages known to the art. In some embodiments, the software module presents a visual indicator, for the benefit of the learner, that represents the percentage of activities completed within a sequence of activities. In some embodiments, the visual indicator represents the percentage of activities completed within, by way of non-limiting examples, a lesson, an area of skill, interest, or expertise, a multi-area sequence, a level of an area of skill, interest, or expertise, or a level of a multi-area sequence. In further embodiments, the visual indicator represents a percentage as, by way of non-limiting examples, a number, a bar chart, or a pie chart.

Figure 6:
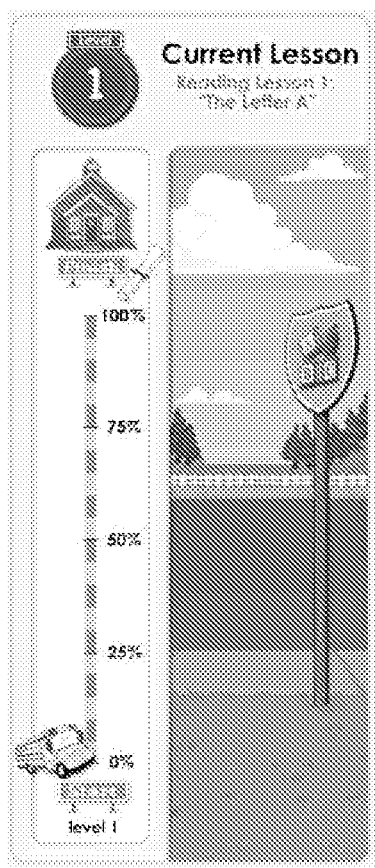
FIG. 6 shows a non-limiting example of a visual indicator for the benefit of the learner, that represents the percentage of activities' completed within a sequence of activities; in this case, a bar chart indicating the percentage of activities completed within a level of a multi-area sequence.

Referring to FIG. 6, in some embodiments, the visual indicator represents the percentage of activities completed within a level of a multi-area sequence as a bar chart.

Guided Learning Mode

In a guided navigational mode the educational system presents to the learner one or more activities in one or more areas of skill, interest, or expertise selected by a mentor to the learner from among a population of activities to create a subpopulation of activities. In some embodiments, the guided navigational mode further comprises a software module for building lessons, for use by a mentor to the learner, and a software module for displaying and providing access to lessons, for use by the learner. In view of the disclosure provided herein, the software modules are created by techniques known to those of skill in the art using machines, software, and languages known to the art. In some embodiments, the subpopulation of activities is selected based on the mentor's understanding of the learner's preferences for particular learning activities. In some embodiments, the subpopulation of activities is selected to bolster specific gaps in the learner's knowledge or understanding. In some embodiments, the subpopulation of activities is selected to prepare the learner for a particular certification or examination. In some embodiments, the subpopulation of activities is selected to provide understanding of one or more topics in a published educational standard.

In some embodiments, a mentor may designate the selected subpopulation of activities as macro-sequenced lessons in a sequenced learning mode. In additional embodiments, a mentor may designate the selected subpopulation of activities as micro-sequenced activities within a lesson in a sequenced learning mode.

A mentor to the learner builds lessons by selecting activities from among a population of activities to create a subpopulation of activities. In some embodiments, the software module for building lessons requires a password to select activities to create a subpopulation of activities. In some embodiments, a mentor selects activities by selecting elements associated with the activities including, by way of non-limiting examples, text, icons, or check boxes. In some embodiments, a mentor selects elements associated with activities using a pointing device including, by way of non-limiting examples, a mouse, trackball, track pad, or stylus. In further embodiments, a mentor makes selections with a pointing device by actions including, by way of non-limiting examples, clicking, double clicking, right clicking, dragging, or drawing a line, circle, or other shape. In some embodiments, a mentor selects elements associated with activities using a touch screen or multi-touch screen. In further embodiments, a mentor makes selections with a touch screen or multi-touch screen by actions including, by way of non-limiting examples, tapping, double tapping, dragging, pinching, or drawing a line, circle, or other shape. In other embodiments, a mentor selects elements associated with activities using a microphone to capture voice or other sound input. In other embodiments, a mentor selects elements associated with activities using a video camera to capture motion or visual input. In some embodiments, a mentor selects activities using a keyboard, or alternative text input device, by typing names of activities or other text associated with activities.

Figure 7:
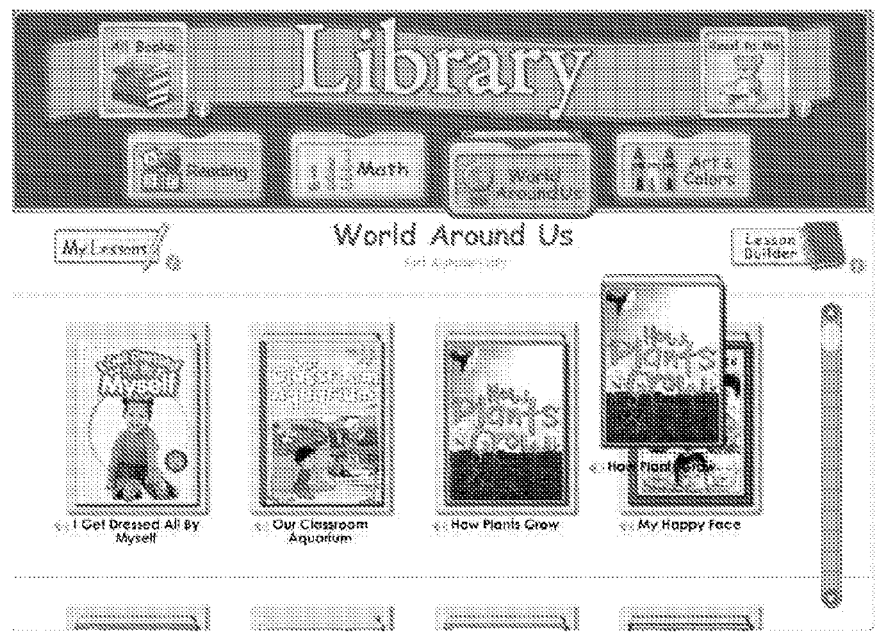
FIG. 7 shows a non-limiting example of a mentor selecting activities from among a population of activities to create a subpopulation of activities; in this case, a mentor to the learner selects activity icons by dragging activity icons and dropping the activity icons into a designated area.

Referring to FIG. 7, in some embodiments, a mentor to the learner selects activity icons by dragging activity icons and dropping the activity icons into a designated area. In further embodiments, the designated area is available in all parts of the educational environment where activity icons are present. In further embodiments, the designated area is a lesson builder icon.

Figure 8:
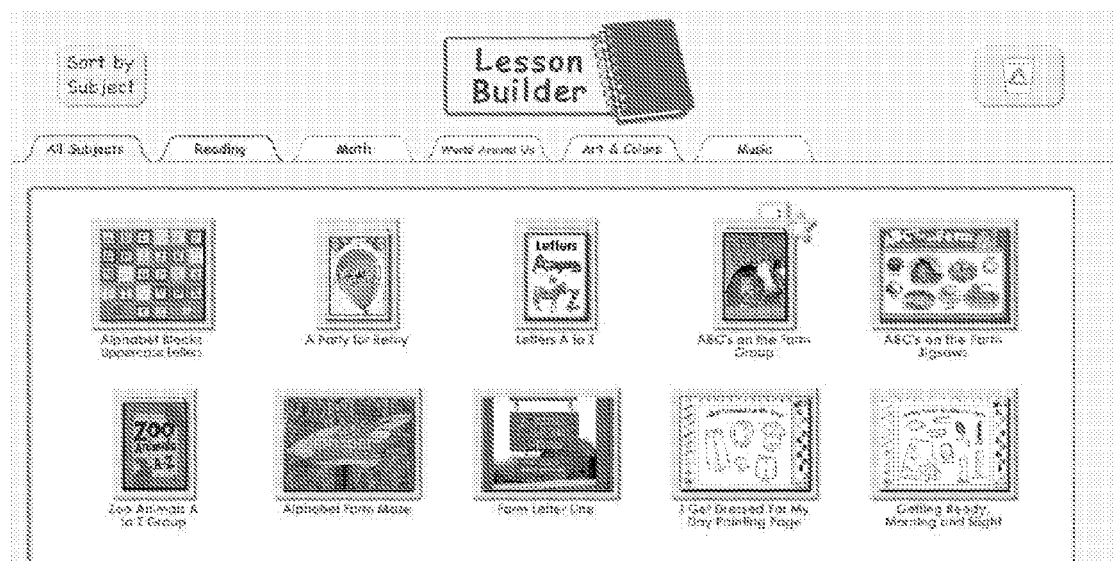
FIG. 8 shows a non-limiting example of a software module for building lessons allowing a mentor to view and sort a subpopulation of activities; in this case, a mentor has the option to view and sort the subpopulation of activities by area of skill, interest, or expertise.

Referring to FIG. 8, the software module for building lessons is further characterized by allowing said mentor to view and sort the subpopulation of activities. In some embodiments, a mentor has the option to view and sort the subpopulation of activities by criteria including, by way of non-limiting examples, area of skill, interest, or expertise, activity type, length of activity, or level of activity.

Also referring to FIG. 8, the software module for building lessons is further characterized by allowing said mentor to sequence the subpopulation of activities. In some embodiments, a mentor has the option to sequence the subpopulation of activities by ranking the activities. In some embodiments, a mentor has the option to sequence the subpopulation of activities by dragging and dropping text or icons associated with activities.

Figure 9:
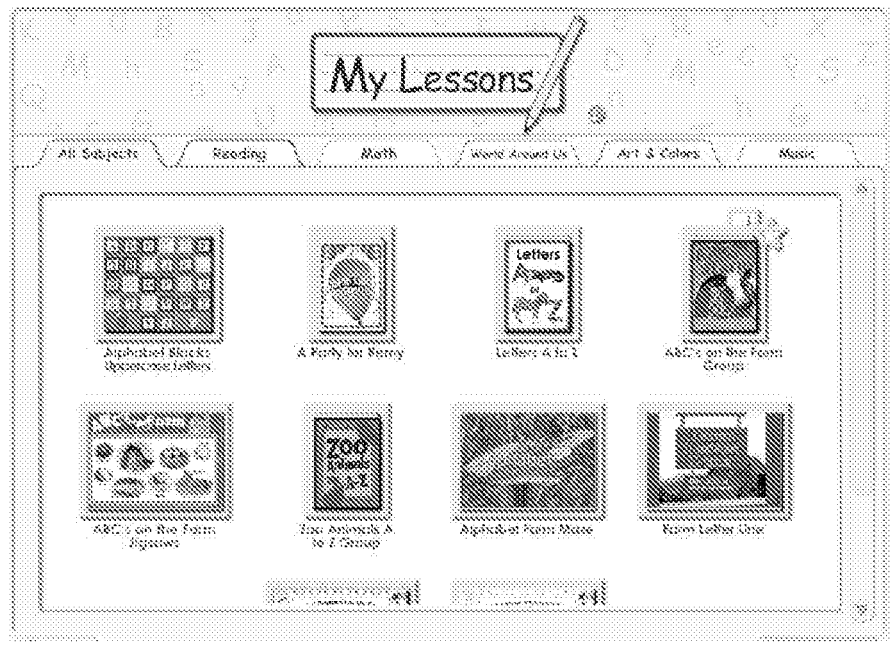
FIG. 9 shows a non-limiting example of a software module for displaying and providing access to lessons allowing the learner to view, sort, and access the subpopulation of activities; in this case, the learner has the option to view, sort, and access the subpopulation of activities by area of skill, interest, or expertise.

Referring to FIG. 9, the software module for displaying and providing access to lessons is further characterized by allowing the learner to view, sort, and access the subpopulation of activities. In some embodiments, the learner has the option to view and sort the subpopulation of activities by criteria including, by way of non-limiting examples, area of skill, interest, or expertise, activity type, activity length, or activity level. In some embodiments, the software module for displaying and providing access to lessons is further characterized by displaying the subpopulation of activities in the sequence determined by said mentor to the learner. In other embodiments, the software module for displaying and providing access to lessons is further characterized by displaying the subpopulation of activities in a sequence aligned to a predetermined sequence. In still other embodiments, the software module for displaying and providing access to lessons is further characterized by displaying the subpopulation of activities in a sequence aligned to a published educational standard.

In some embodiments, in a guided navigational mode, the learner must complete the subpopulation of activities in the sequence determined by said mentor to the learner. In such embodiments, the learner must complete each preceding activity in the sequence to progress to the next activity. In some embodiments, the learner has the option to repeat previously completed activities. In further embodiments, the learner has the option to complete the same activity multiple times. In other embodiments, the learner is free to complete the subpopulation of activities in any sequence.

Independent Learning Mode

In an independent navigational mode the learner freely selects activities from among a population of activities. The learner selects activities and accesses them by interacting with selectable elements including, by way of non-limiting examples, text, hyperlinks, icons, buttons and other visual elements, keystrokes, interactive elements, auditory elements, voice-sensitive elements, motion-sensitive elements, gestural elements, animated elements, and combinations thereof. In some embodiments, the selectable elements include elements to access a desired area of skill, interest, or expertise. In some embodiments, the selectable elements include elements to access a desired activity type. In some embodiments, the selectable elements include elements to access a desired activity theme. In some embodiments, the selectable elements include combinations of the elements disclosed herein. In some embodiments, a plethora of selectable elements allows the learner to freely browse, explore, and select learning activities according to their interests and preferences.

In some embodiments, selectable elements to access a desired area of skill, interest, or expertise are selected from hobbies and personal interests including elements providing access to, by way of non-limiting examples, animal husbandry, animal breeding, antiquing, artistic endeavors, automobile restoration, automobile repair, bird watching, collecting, cooking, creating dioramas, fish keeping, fishing, flower arranging, game playing, gardening, horticulture, investing, knitting, origami, outdoor recreation, performing arts, poetry, quilting, reading, sewing, scale modeling, scrapbooking, wine tasting, writing, and yoga. In further embodiments, artistic endeavors include endeavors such as drawing, glass blowing, painting, sculpting, photography, and pottery. In further embodiments, collecting includes collecting art, coins, dolls, figurines, stamps, spoons, sports cards, and toys. In further embodiments, outdoor recreation includes activities such as backpacking, bicycling, canoeing, caving, climbing, hiking, running, snow sports, and water sports. In further embodiments, performing arts include activities such as acting, dancing, singing, juggling, magic, and playing musical instruments. In further embodiments, reading includes reading materials such as books, comics, magazines, and newspapers. In further embodiments, scale modeling includes subject matter such as automobiles, planes, ships, and trains.

In some embodiments, selectable elements to access a desired area of skill, interest, or expertise are selected from basic subjects including, by way of non-limiting examples, reading and mathematics. In further embodiments, the subjects include one or more basic topics including, by way of non-limiting examples, letters, phonics, word families, sight words, numbers, and shapes.

In some embodiments, selectable elements to access a desired area of skill, interest, or expertise are selected from preschool subjects including, by way of non-limiting examples, language arts, mathematics, social studies, science, music, art, and additional languages. In further embodiments, the subjects include one or more preschool topics including, by way of non-limiting examples, citizenship, colors, computer skills, drawing, ethics, geography, music, physical education, poetry, reading, sign language, Spanish, spelling, and U.S. history.

In some embodiments, selectable elements to access a desired area of skill, interest, or expertise are selected from grade school subjects including, by way of non-limiting examples, language arts, mathematics, social studies, science, music and other performing arts, visual arts, additional languages, health, fitness and sports, and information technology. In further embodiments, the subjects include one or more grade school topics including, by way of non-limiting examples, biology, chemistry, citizenship, composition, computer skills, drawing, earth science, ethics, geography, grammar, physical education, poetry, pre-algebra, reading, sign language, spelling, U.S. government, U.S. history, and writing.

In some embodiments, selectable elements to access a desired area of skill, interest, or expertise are selected from middle school subjects including, by way of non-limiting examples, language arts, mathematics, social studies, science, music and other performing arts, visual arts, additional languages, health, fitness and sports, and information technology. In further embodiments, the subjects include one or more middle school topics including, by way of non-limiting examples, algebra, American literature, biology, chemistry, composition, computer skills, drawing, earth science, ethics, geography, geometry, grammar, journalism, photography, physical education, poetry, pre-algebra, reading, spelling, U.S. government, U.S. history, world history, and writing.

In some embodiments, selectable elements to access a desired area of skill, interest, or expertise are selected from high school subjects including, by way of non-limiting examples, language arts, mathematics, social studies, science, music and other performing arts, visual arts, additional languages, health, fitness and sports, and information technology. In further embodiments, the subjects include one or more high school topics including, by way of non-limiting examples, U.S. history, U.S. government, world history, European history, economics, geography, psychology, sociology, anthropology, philosophy, biology, ecology, anatomy, physiology, chemistry, physics, earth science, astronomy, algebra, statistics, geometry, calculus, trigonometry, grammar, spelling, writing, American literature, European literature, English literature, world literature, composition, poetry, drawing, painting, photography, film, theatre, journalism, computer skills, computer science, computer programming, business, physical education, and sign language.

In some embodiments, selectable elements to access a desired area of skill, interest, or expertise are selected from higher education subjects including, by way of non-limiting examples, language arts, mathematics, social studies, science, music and other performing arts, visual arts, additional languages, health, fitness and sports, and information technology. In further embodiments, the subjects include one or more higher education topics including, by way of non-limiting examples, U.S. history, U.S. government, world history, European history, economics, macroeconomics, microeconomics, psychology, sociology, anthropology, philosophy, law, political science, education, urban studies, women's studies, biology, botany, ecology, environmental studies, anatomy, physiology, virology, pharmacology, cell biology, molecular biology, microbiology, genetics, medicine, neuroscience, chemistry, organic chemistry, biochemistry, physical chemistry, biophysics, physics, earth science, astronomy, astrophysics, algebra, statistics, geometry, calculus, trigonometry, electrical engineering, civil engineering, mechanical engineering, chemical engineering, writing, American literature, European literature, English literature, world literature, composition, poetry, music theory, religion, drawing, painting, photography, film, theatre, journalism, computer science, computer programming, business, business administration, accounting, nursing, law enforcement, physical education, and sign language.

In some embodiments, selectable elements to access a desired area of skill, interest, or expertise are selected from professional topics including, by way of non-limiting examples, continuing legal education, continuing medical education, and continuing education for teachers, accountants, tax preparers, physical therapists, occupational therapists, psychologists, nurses, and nurse practitioners.

In some embodiments, selectable elements to access a desired area of skill, interest, or expertise are selected from professional skills including elements providing access to, by way of non-limiting examples, organization, leadership, time management, negotiation, harassment awareness, conflict management, interviewing, and networking.

In some embodiments, selectable elements to access a desired activity type are selected from informal activities including elements providing access to, by way of non-limiting examples, demonstrations, how-to-articles, how-to-videos, and simulations.

In some embodiments, selectable elements to access a desired activity type are selected from preschool activities including elements providing access to, by way of non-limiting examples, books, games, puzzles, art, and music.

In some embodiments, selectable elements to access a desired activity type are selected from K-12 activities including elements providing access to, by way of non-limiting examples, books, games, puzzles, art, music, reading assignments, articles, videos, demonstrations, simulations, quizzes, examinations, worksheets, problem sets, brainstorms, and journals.

In some embodiments, selectable elements to access a desired activity type are selected from higher education activities including elements providing access to, by way of non-limiting examples, books, reading assignments, lectures, articles, videos, demonstrations, simulations, mock examinations, quizzes, examinations, essays, laboratory experiments, problem sets, brainstorms, and journals.

In some embodiments, selectable elements to access a desired activity type are selected from professional activities including elements providing access to, by way of non-limiting examples, books, articles, brainstorms, collaborations, group activities, multi-player games, videos, lectures, role-plays, simulations, demonstrations, quizzes, and exams.

In some embodiments, selectable elements to access a desired activity theme are selected from preschool themes including elements representing, by way of non-limiting examples, a farm, a zoo, toddler time, and basics. In further of these embodiments, selectable elements to access a desired theme also include, by way of non-limiting examples, iconic representations of an easel, a solar system, calendar, piano, map, clock, number line, bookshelf; computer, and aquarium.

In some embodiments, selectable elements to access a desired activity theme are selected from K-12 themes including elements representing, by way of non-limiting examples, a library, time machine, space station, amusement park, carnival, sporting event, shopping mall, market, laboratory, garage, kitchen, and medical facility.

In some embodiments, selectable elements to access a desired activity theme are selected from higher education themes including elements representing, by way of non-limiting examples, a library, laboratory, observatory, submarine, operating room, world map, courtroom, crime scene, boardroom, bank, art studio, and theatre.

In some embodiments, selectable elements to access a desired activity theme are selected from professional themes including elements representing, by way of non-limiting examples, a library, conference room, trade conference, trade show, adult education classroom, boardroom, and interview room.

In some embodiments, a learner's completion of an activity selected by the learner in an independent navigational mode is the equivalent of completing the same activity in a predetermined sequence of activities in a sequenced or guided navigational mode. In some further embodiments, completion of an activity selected by the learner in an independent naviga- tional mode will allow the learner to later proceed past that same activity if encountered in a predetermined sequence of activities in a sequenced or guided navigational mode. In some further embodiments, completion of an activity selected by the learner in an independent navigational mode will cause the activity to be marked as completed in progress displays and printable reports associated with any navigational mode.

Switching Navigational Modes

In some embodiments of the educational system disclosed herein, the navigational mode or modes available to the learner are determined by a mentor to the learner or by an instructional designer. In some embodiments, the navigational mode or modes available to the learner are determined by the learner's age. In other embodiments, the learner has the option to switch between available navigational modes. In further embodiments, the learner has the option to freely use any navigational mode offered by the web-based educational system disclosed herein. In other embodiments, the learner has the option to select one or more navigational modes in a settings area of the educational environment.

In one embodiment, the educational system offers a sequenced navigational mode, a guided navigational mode, and an independent navigational mode; however, the learner or a mentor to the learner has restricted availability of the sequenced navigational mode. In such an embodiment, the learner has the option to switch between the guided navigational mode and the independent navigational mode.

In one embodiment, the educational system offers a sequenced navigational mode, a guided navigational mode, and an independent navigational mode; however, the learner or a mentor to the learner has restricted availability of the guided navigational mode. In such an embodiment, the learner has the option to switch between the sequenced navigational mode and the independent navigational mode.

In one embodiment, the educational system offers a sequenced navigational mode, a guided navigational mode, and an independent navigational mode; however, the learner or a mentor to the learner has restricted availability of the independent navigational mode. In such an embodiment, the learner has the option to switch between the sequenced navigational mode and the guided navigational mode.

Other Non-Limiting Embodiments

In some embodiments, the educational system disclosed herein further comprises a software module for monitoring the progress of the learner. In view of the disclosure provided herein, the software module is created by techniques known to those of skill in the art using machines, software, and languages known to the art. In some embodiments, the software module allows both the learner and a mentor to the learner to independently monitor the progress of the learner in each area of skill, interest, or expertise and each level within each area of skill, interest, or expertise. In further embodiments, the software module further includes progress displays, also referred to as progress reports, progress records, or progress logs. In still further embodiments, the software module includes printable reports of the learner's progress.

In some embodiments, the progress displays indicate percentage completion of one or more areas of skill, interest, or expertise. In some embodiments, the progress displays indicate percentage completion of one or more levels within each area of skill, interest, or expertise. In some embodiments, the progress displays indicate completion of each activity associated with each sequence of activities. In further embodiments, the progress displays indicate completion of each activity associated with one or more areas of skill, interest, or expertise. In further embodiments, the progress displays indicate completion of each activity associated with one or more levels within each area of skill, interest, or expertise. In still further embodiments, the progress displays indicate the number of times each activity has been completed. In some embodiments, the number of times each activity has been completed is represented, by way of non-limiting examples, as a number, a percentage, a color, a shape, or by an icon such as a star, checkmark, dot, or smiley face.

In some embodiments, the progress displays indicate performance via, by way of non-limiting examples, raw scores or percentages. Some embodiments might also indicate performance by metrics such as grades. In some embodiments, the progress displays indicate performance in one or more areas of skill, interest, or expertise. In some embodiments, the progress displays indicate performance in one or more levels within each area of skill, interest, or expertise. In some embodiments, the progress displays indicate performance in each activity associated with each sequence of activities. In further embodiments, the progress displays indicate performance in each activity associated with one or more areas of skill, interest, or expertise. In further embodiments, the progress displays indicate performance in each activity associated with one or more levels within each area of skill, interest, or expertise.

In some embodiments, the progress displays indicate time spent on one or more areas of skill, interest, or expertise. In some embodiments, the progress displays indicate time spent on one or more levels within each area of skill, interest, or expertise. In some embodiments, the progress displays indicate time spent on each activity associated with each sequence of activities. In further embodiments, the progress displays indicate time spent on each activity associated with one or more areas of skill, interest, or expertise. In further embodiments, the progress displays indicate time spent on each activity associated with one or more levels within each area of skill, interest, or expertise.

Figure 10:
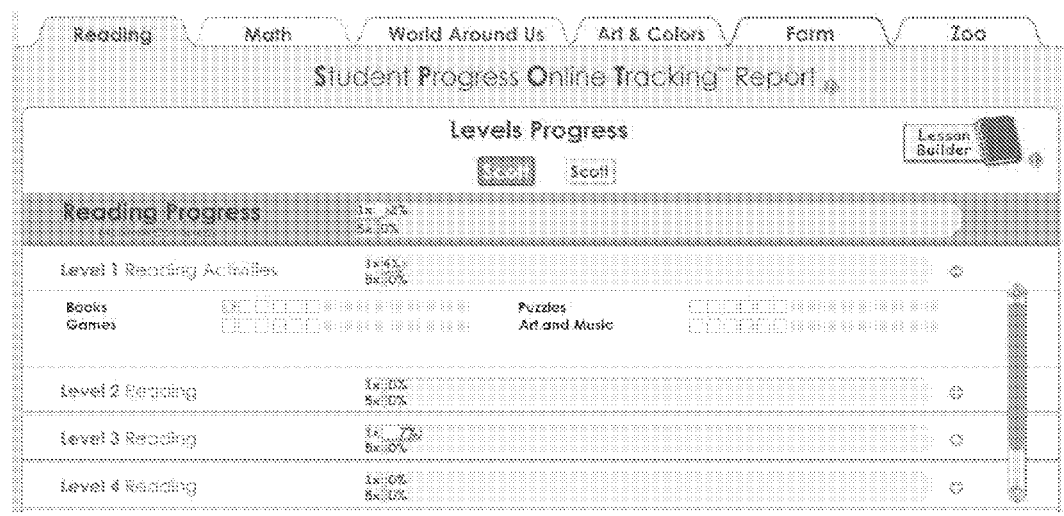
FIG. 10 shows a non-limiting example of a software module for monitoring the progress of the learner that includes a display of the learner's progress for the benefit of a mentor; in this case, the progress display indicates percentage completion of multiple areas of skill, interest, or expertise, percentage completion of multiple levels within each area of skill, interest, or expertise, and completion of each activity associated with each level within each area of skill, interest, or expertise.

Referring to FIG. 10, in some embodiments, the software module for monitoring the progress of the learner further includes a display of the learner's progress for the benefit of a mentor. In some embodiments, the progress displays indicate percentage completion of one or more areas of skill, interest, or expertise. In some embodiments, the progress displays indicate percentage completion of one or more levels within each area of skill, interest, or expertise. In some embodiments, the progress displays indicate completion of each activity associated with each sequence of activities. In further embodiments, the progress displays indicate completion of each activity associated with one or more areas of skill, interest, or expertise. In further embodiments, the progress displays indicate completion of each activity associated with one or more levels within each area of skill, interest, or expertise. In some embodiments, the software module for monitoring the progress of the learner in each of the areas of skill, interest, or expertise includes printable reports adapted for use by a mentor to the learner. In further embodiments, the progress displays and printable reports adapted for use by a mentor are secure and cannot be accessed by the learner or others.

Figure 11:
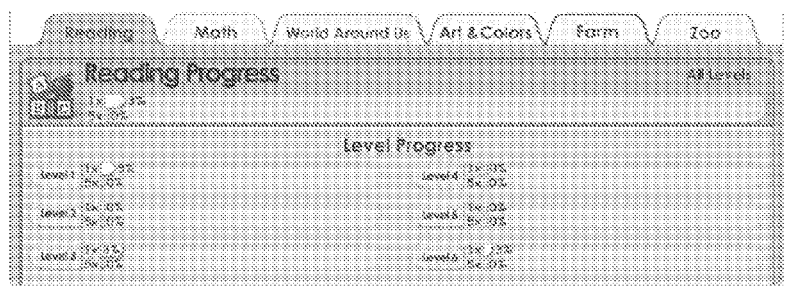
FIG. 11 shows a non-limiting example of a software module for monitoring the progress of the learner that includes a display of the learner's progress for the benefit of the learner; in this case, the progress display indicates percentage completion of multiple areas of skill, interest, or expertise and percentage completion of multiple levels within each area of skill, interest, or expertise.

Referring to FIG. 11, in some embodiments, the software module for monitoring the progress of the learner further includes a display of the learner's progress for the benefit of the learner. In some embodiments, the progress displays indicate percentage completion of one or more areas of skill, interest, or expertise. In some embodiments, the progress displays indicate percentage completion of one or more levels within each area of skill, interest, or expertise. In some embodiments, the software module for monitoring the progress of the learner in each of the areas of skill, interest, or expertise includes printable reports adapted for use by the learner.

In some embodiments, the top-level GUI includes multiple navigational tabs that provide quick access to commonly used features of the educational system including, by way of non-limiting examples, progress displays, printable progress reports, lessons created by one or more mentors, most frequently viewed activities, and e-commerce functions.

Computer Readable Media Encoded With a Computer Program

Also described herein is computer readable media encoded with computer programs including instructions executable by a digital processing system for delivering content to create an educational environment. The educational environment comprises at least one area of skill, interest, or expertise, a plurality of activities associated with each area of skill, interest, or expertise, and at least three navigational modes. The navigational modes include a sequenced navigational mode, a guided navigational mode, and an independent navigational mode. Optionally, the learner can switch between available navigational modes.

Method of Facilitating the Educational Development of a Learner

Also described herein are methods of facilitating the educational development of a learner by providing executable instructions via the Internet to a digital processing device to create an educational environment. The digital processing device comprises an operating system configured to perform executable instructions, a memory device, a display, a sound output device, and an input device. The educational environment comprises at least one area of skill, interest, or expertise, a plurality of activities associated with each area of skill, interest, or expertise, and at least three navigational modes. The navigational modes include a sequenced navigational mode, a guided navigational mode, and an independent navigational mode. Optionally, the learner can switch between available navigational modes.

EXAMPLES

The following illustrative examples are representative embodiments of the web-based educational system described herein and are not meant to be limiting in any way.

Example 1

Sequenced Learning

A web-based educational system is developed comprising a desktop computer connected to the Internet and a computer program delivered via the World Wide Web that creates an educational environment in Adobe® Flash®, XHTML, and CSS format. The educational environment's GUI is designed to represent a preschool classroom. The educational environment includes four subjects: reading, math, world around us (comprising science and social studies), and art. Associated with each of the four subjects are activities in the form of songs, books, puzzles, games, and printables. The educational environment also includes three navigational modes. First, a sequenced navigational mode wherein the learner is presented with a predetermined sequence of activities and the learner must complete each preceding activity in the sequence to progress to the next. Second, a guided navigational mode wherein the learner is presented with activities selected by a mentor from among a population of activities to create a subpopulation of activities. Third, an independent navigational mode wherein the learner has the option to select any activity. The learner has the option of switching between the three navigational modes.

The web-based educational system is used for a preschool aged learner mentored by a private school teacher. The learner is instructed to use a sequenced navigational mode which presents a predetermined sequence of thirty activities associated with each of the four age appropriate subjects. The learner uses the system for twenty minutes per day for two weeks. The child is informed of her progress through the sequence of activities by a bar graph indicator of her percentage completion of the sequence. The child's teacher concurrently monitors her progress in the sequence of activities via a progress display generated by the system.

Example 2

Guided Learning

A web-based educational system is developed comprising a laptop computer connected to the Internet and a computer program delivered via the World Wide Web that creates an educational environment in Apple® QuickTime®, XHTML, CSS, and AJAX format. The educational environment includes several topics including Spanish, U.S. history, U.S. government, geography, biology, chemistry, algebra, American literature, composition, and computer skills. Associated with each of the subjects are activities in the form of books, articles, games, puzzles, music, videos, quizzes, and examinations. The educational environment also includes three navigational modes. First, a sequenced navigational mode wherein the learner is presented with a predetermined sequence of activities and the learner must complete each preceding activity in the sequence to progress to the next Second, a guided navigational mode wherein the learner is presented with activities selected by a mentor from among a population of activities to create a subpopulation of activities. Third, an independent navigational mode wherein the learner has the option to select any activity. The learner has the option of switching between the three navigational modes.

The web-based educational system is used for a middle school aged learner mentored by a parent. The learner expressed passing interest in the American Revolution. In response, the learner's father uses the system to browse activities in the U.S. history, U.S. government, geography, and American literature topics. He selects seven relevant activities by clicking and dragging icons associated with the activities to a "lesson builder" area to create a subpopulation of activities. He then orders the activities, by further clicking and dragging them, to best tell the story of the American Revolution. The learner's father asks his son to use the system's "my lessons" feature to view and access the lesson.

Example 3

Independent Learning

A web-based educational system is developed comprising a tablet computer connected to the Internet and a computer program delivered via the World Wide Web that creates an educational environment in Adobe® Flash®, HTML, CSS, and Javascript format. The educational environment's GUI is designed to represent a professional trade show. The educational environment includes topics addressing professional skills; specifically, negotiation, sales, and contracts. Associated with each of the curricula are activities in the form of lectures, demonstration videos, simulations, role plays, and quizzes. The educational environment also includes three navigational modes. First, a sequenced navigational mode wherein the learner is presented with a predetermined sequence of activities and the learner must complete each preceding activity in the sequence to progress to the next. Second, a guided navigational mode wherein the learner is presented with activities selected by a mentor from among a population of activities to create a subpopulation of activities. Third, an independent navigational mode wherein the learner has the option to select any activity.

The web-based educational system is used for a professional adult who is in her first year as a sales person for a medical supplies manufacturer. She is mentored in her profession by a sales manager. Her mentor restricts the navigational modes offered by the system such that only an independent navigational mode is available. The trainee uses the tablet computer to access the system for forty-five minutes, three times a week, in order to hone her skills for an upcoming trade show. She freely selects from among all the available activities using hyperlinks to select activities by topic and by activity type.

What is claimed is:
1. A web-based educational system comprising:
(a) a digital processing device comprising a processor and an operating system configured to perform executable instructions; and
(b) a computer program including instructions executable by a digital processing system that create an educational environment for a learner, the educational environment comprising: at least one area of skill, interest, or expertise; a plurality of activities associated with each area of skill, interest, or expertise; and, at least three navigational modes comprising:
  i. a sequenced navigational mode wherein said web-based educational system presents to a learner a predetermined sequence of more than one activity in one or more areas of skill, interest, or expertise wherein the learner must complete each preceding activity in the sequence to progress to the next;
  ii. a guided navigational mode wherein said web-based educational system presents to the learner one or more activities in one or more areas of skill, interest, or expertise selected by a human mentor from among a population of activities to create a subpopulation of activities;
  iii. an independent navigational mode wherein said web-based educational system presents navigational elements to allow the learner to select activities from among a population of activities; and
  iv. optionally, the educational environment provides the learner with the ability to switch between said navigational modes.

2. The web-based educational system of claim 1, wherein the learner or a mentor to the learner has the ability to restrict availability of one or more navigational modes offered by the web-based educational system.

3. The web-based educational system of claim 1, wherein said sequenced navigational mode includes a software module for removing one or more areas of skill, interest, or expertise from the predetermined sequence of more than one activity.

4. The web-based educational system of claim 1, wherein in said guided navigational mode the learner selects activities from among said subpopulation of activities.

5. The web-based educational system of claim 1, wherein completion of an activity selected by the learner in said independent navigational mode is the equivalent of completing the same activity in said sequenced or guided navigational mode.

6. The web-based educational system of claim 5, wherein completion of an activity in said independent navigational mode is equivalent in said sequenced or guided navigational mode with regard to progressing to subsequent activities in a predetermined sequence.

7. The web-based educational system of claim 5, wherein completion of an activity in said independent navigational mode is equivalent in said sequenced or guided navigational mode with regard to tracking and reporting progress or performance of the learner.

8. The web-based educational system of claim 1, further comprising a top-level graphic user interface characterized by representing a classroom environment.

9. The web-based educational system of claim 1, further comprising a top-level graphic user interface characterized by including a representation of an instructor, wherein the learner or a mentor to the learner has the ability to customize the appearance of the instructor.

10. The web-based educational system of claim 1, further comprising a top-level graphic user interface characterized by representing one or more environments selected from: a zoo, farm, park, beach, mountain, desert, ocean, lake, jungle, tunnels, caves, undersea environments, extraterrestrial environments, arctic and Antarctic environments, garden, campus, laboratory, art studio, music conservatory, computer laboratory, observatory, planetarium, library, movie theatre, play, puppet show, sporting event, amusement park, carnival, theme park, shopping mall, market, store, kitchen, garage, machine shop, wood working shop, metal working shop, medical facility, courtroom, boardroom, conference room, trade show, trade conference, interview room, and bank.

11. The web-based educational system of claim 1, wherein each area of skill, interest, or expertise comprises a plurality of levels.

12. The web-based educational system of claim 1, wherein one or more activities is available, in one or more languages selected from English, Spanish, Italian, Portuguese, French, Dutch, Polish, German, Russian, Ukrainian, Mandarin, Wu, Cantonese, Hindi, Punjabi, Bengali, Marathi, Urdu, Arabic, Turkish, Tamil, Farsi, Japanese, Korean, Vietnamese, That, Burmese, Malay, Telugu, Javanese, and Tagalog.

13. The web-based educational system of claim 1, further comprising a glossary of words used in one or more activities.

14. The web-based educational system of claim 1, wherein said sequenced navigational mode is further characterized by comprising a software module for displaying said predetermined sequence of more than one activity in one or more areas of skill, interest, or expertise, wherein said software module is characterized by representing said sequence of more than one activity as a linear succession and representing lessons, comprising groups of activities, as points in the linear succession, wherein said software module is adapted for use by the learner.

15. The web-based educational system of claim 14, wherein said linear succession is further represented as a map, path, or road and said lessons, comprising groups of activities, are further represented as waypoints or stops on the map, path, or road.

16. The web-based educational system of claim 14, wherein said sequenced navigational mode is further characterized by comprising a software module for displaying said lessons, comprising groups of activities, and providing access to the activities, wherein said software module is characterized by representing said lessons as a group of selectable activity icons, wherein said software module is adapted for use by the learner.

17. The web-based educational system of claim 16, wherein said group of selectable activity icons is further represented on a whiteboard, chalkboard, or bulletin board.

18. The web-based educational system of claim 14, wherein said predetermined sequence of more than one activity in one or more areas of skill, interest, or expertise is selected by an instructional designer.

19. The web-based educational system of claim 14, wherein each step in said predetermined sequence of more than one activity comprises either an activity or a set of activities, wherein one activity selected from the set of activities is presented at any of each said steps.

20. The web-based educational system of claim 19, wherein said web-based educational system presents an activity from said set of activities based on one or more of: the skill level of the learner, the performance of the learner in previously completed activities, input of a mentor to the learner, or the preference of the learner.

21. The web-based educational system of claim 14, further comprising a software module for monitoring the progress of the learner, wherein said software module includes a visual indicator adapted for use by the learner, wherein said visual indicator displays the percentage of activities completed within a sequence of activities.

22. The web-based educational system of claim 1, further comprising a software module for monitoring the progress of the learner, wherein said software module includes progress displays adapted for use by the learner or a mentor to the learner.

23. The web-based educational system of claim 22, wherein said progress displays indicate percentage completion of one or more areas of skill, interest, or expertise, percentage completion of one or more levels within each area of skill, interest, or expertise, and completion of each activity associated with each area of skill, interest, or expertise.

24. The web-based educational system of claim 22, wherein the software module for monitoring the progress of the learner in each of the areas of skill, interest, or expertise includes printable reports adapted for use by the learner or a mentor to the learner.

25. The web-based educational system of claim 1, wherein at least one area of skill, interest, or expertise is selected from reading, math, art, music, colors, science, and social studies.

26. The web-based educational system of claim 1, wherein at least one area of skill, interest, or expertise is selected from animal husbandry, animal breeding, antiquing, artistic endeavors such as drawing, glass blowing, painting, sculpting, photography, and pottery, automobile restoration, automobile repair, bird watching, collecting items such as art, coins, dolls, figurines, stamps, spoons, sports cards, and toys, cooking, creating dioramas, fish keeping, fishing, flower arranging, game playing, gardening, horticulture, investing, knitting, origami, outdoor recreation endeavors such as backpacking, bicycling, canoeing, caving, climbing, hiking, running, snow sports, and water sports, performing arts such as acting, dancing, singing, juggling, magic, and playing musical instruments, poetry, quilting, reading books, comics, magazines, and newspapers, sewing, scale modeling of automobiles, planes, ships, and trains, scrapbooking, wine tasting, writing, and yoga.

27. The web-based educational system of claim 1, wherein at least one area of skill, interest, or expertise is selected from Spanish, French, German, Mandarin, Italian, Latin, U.S. history, U.S. government, world history, European history, economics, macroeconomics, microeconomics, geography, psychology, sociology, anthropology, philosophy, law, political science, education, urban studies, women's studies, health, biology, ecology, environmental studies, anatomy, physiology, virology, pharmacology, cell biology, molecular biology, microbiology, genetics, medicine, neuroscience, chemistry, organic chemistry, biochemistry, physical chemistry, biophysics, physics, earth science, astronomy, astrophysics, algebra, statistics, geometry, calculus, trigonometry, electrical engineering, civil engineering, mechanical engineering, chemical engineering, English, American literature, European literature, English literature, world literature, religion, grammar, spelling, writing, composition, poetry, music, music theory, drawing, painting, photography, film, theatre, journalism, computer skills, computer science, computer programming, business, business administration, accounting, nursing, physical education, and sign language.

28. The web-based educational system of claim 1, wherein at least one area of skill, interest, or expertise is selected from continuing legal education, continuing medical education, and continuing education for teachers, accountants, tax preparers, physical therapists, occupational therapists, psychologists, nurses, and nurse practitioners.

29. The web-based educational system of claim 1, wherein at least one area of skill, interest, or expertise is selected from organization, leadership, time management, negotiation, harassment awareness, conflict management, interviewing, and networking.

30. The web-based educational system of claim 1, wherein at least one activity associated with each area of skill, interest, or expertise is selected from books, games, puzzles, art, and music.

31. The web-based educational system of claim 30, wherein at least one activity associated with each area of skill, interest, or expertise is further selected from lectures, reading assignments, articles, videos, demonstrations, simulations, mock examinations, quizzes, examinations, essays, worksheets, laboratory experiments, problem sets, brainstorms, collaborations, group activities, multi-player games, role-plays, and journals.

32. The web-based educational system of claim 1, wherein said guided navigational mode is further characterized by comprising a software module for building lessons by selecting one or more activity icons, wherein said software module is adapted for use by a mentor to the learner.

33. The web-based educational system of claim 32, wherein said software module for building lessons is further characterized by allowing said mentor to sequence the subpopulation of activities.

34. The web-based educational system of claim 33, wherein said activities are selected and sequenced by actions selected from dragging, clicking, tapping, double-clicking, double-tapping, right-clicking, pinching, ranking, typing, speaking, and by drawing a line, circle, or other shape.

35. The web-based educational system of claim 1, wherein said guided navigational mode is further characterized by comprising a software module for displaying the subpopulation of activities selected by said mentor, wherein said software module is adapted for use by the learner.

36. The web-based educational system of claim 35, wherein said software module for displaying the subpopulation of activities selected by said mentor is further characterized by displaying the subpopulation of activities in a sequence determined by said mentor to the learner.

37. The web-based educational system of claim 36, wherein the learner must complete each preceding activity in the displayed sequence determined by said mentor to progress to the next.

38. The web-based educational system of claim 35, wherein said software module for displaying the subpopulation of activities selected by said mentor is further characterized by displaying the subpopulation of activities in a sequence aligned to a predetermined sequence.

39. The web-based educational system of claim 38, wherein the learner must complete each preceding activity in the displayed sequence aligned to a predetermined sequence to progress to the next.

40. The web-based educational system of claim 1, wherein said independent navigational mode is further characterized by the learner freely using a plurality of selectable elements to access the population of activities, wherein said plurality of selectable elements comprises selectable elements to access a desired area of skill, interest, or expertise, selectable elements to access a desired activity type, and selectable elements to access a desired theme.

41. The web-based educational system of claim 40, wherein at least one selectable element to access a desired area of skill, interest, or expertise is selected from reading, math, world around us, and art and colors.

42. The web-based educational system of claim 40, wherein at least one selectable element to access a desired area of skill, interest, or expertise is selected from animal husbandry, animal breeding, antiquing, artistic endeavors such as drawing, glass blowing, painting, sculpting, photography, and pottery, automobile restoration, automobile repair, bird watching, collecting items such as art, coins, dolls, figurines, stamps, spoons, sports cards, and toys, cooking, creating dioramas, fish keeping, fishing, flower arranging, game playing, gardening, horticulture, investing, knitting, origami, outdoor recreation endeavors such as backpacking, bicycling, canoeing, caving, climbing, hiking, running, snow sports, and water sports, performing arts such as acting, dancing, singing, juggling, magic, and playing musical instruments, poetry, quilting, reading books, comics, magazines, and newspapers, sewing, scale modeling of automobiles, planes, ships, and trains, scrapbooking, wine tasting, writing, and yoga.

43. The web-based educational system of claim 40, wherein at least one selectable element to access a desired area of skill, interest, or expertise is selected from Spanish, French, German, Mandarin, Italian, Latin, U.S. history, U.S. government, world history, European history, economics, macroeconomics, microeconomics, geography, psychology, social studies, sociology, anthropology, philosophy, law, political science, education, urban studies, women's studies, health, science, biology, ecology, environmental studies, anatomy, physiology, virology, pharmacology, cell biology, molecular biology, microbiology, genetics, medicine, neuroscience, chemistry, organic chemistry, biochemistry, physical chemistry, biophysics, physics, earth science, astronomy, astrophysics, mathematics, algebra, statistics, geometry, calculus, trigonometry, electrical engineering, civil engineering, mechanical engineering, chemical engineering, English, reading, American literature, European literature, English literature, world literature, religion, grammar, spelling, writing, composition, poetry, art, colors, music, music theory, drawing, painting, photography, film, theatre, journalism, computer skills, computer science, computer programming, business, business administration, accounting, nursing, physical education, and sign language.

44. The web-based educational system of claim 40, wherein at least one selectable element to access a desired area of skill, interest, or expertise is selected from continuing education for lawyers, teachers, accountants, tax preparers, doctors, physical therapists, occupational therapists, psychologists, nurses, and nurse practitioners.

45. The web-based educational system of claim 40, wherein at least one selectable element to access a desired area of skill, interest, or expertise is selected from organization, leadership, time management, negotiation, harassment awareness, conflict management, interviewing, and networking.

46. The web-based educational system of claim 40, wherein at least one selectable element to access a desired activity type is selected from music and songs, library, puzzles, and games.

47. The web-based educational system of claim 46, wherein at least one selectable element to access a desired activity type is further selected from lectures, reading assignments, articles, videos, demonstrations, simulations, mock examinations, quizzes, examinations, essays, worksheets, laboratory experiments, problem sets, brainstorms, collaborations, group activities, multi-player games, role-plays, and journals.

48. The web-based educational system of claim 40, wherein at least one selectable element to access a desired theme is selected from farm, zoo, toddlertime, and basics.

49. The web-based educational system of claim 48, wherein at least one selectable element to access a desired theme is further selected from iconic representations of a classroom, easel, solar system, calendar, piano, map, clock, number line, bookshelf, computer, aquarium, library, time machine, space station, amusement park, carnival, sporting event, shopping mall, market, laboratory, garage, kitchen, medical facility, observatory, submarine, operating room, world map, courtroom, crime scene, bank, art studio, theatre, conference room, trade conference, trade show, and interview room.

50. The web-based educational system of claim 1, further comprising a software module adapted for conducting e-commerce transactions.

51. The web-based educational system of claim 50, wherein said e-commerce transactions provide subscription-based access to said web-based educational environment.

52. Non-transitory computer readable media encoded with a computer program including instructions executable by a digital processing system for delivering content to create an educational environment for a learner, the educational environment comprising: at least one area of skill, interest, or expertise; a plurality of activities associated with each area of skill, interest, or expertise; and, at least three navigational modes comprising:
   (a) a sequenced navigational mode wherein said web-based educational system presents to a learner a predetermined sequence of more than one activity in one or more areas of skill, interest, or expertise wherein the learner must complete each preceding activity in the sequence to progress to the next;
   (b) a guided navigational mode wherein said web-based educational system presents to the learner one or more activities in one or more areas of skill, interest, or expertise selected by a human mentor from among a population of activities to create a subpopulation of activities; optionally, the learner selects activities from among said subpopulation of activities;
   (c) an independent navigational mode wherein said web-based educational system presents navigational elements to allow the learner to select activities from among a population of activities; and
   (d) optionally, the educational environment provides the learner with the ability to switch between said navigational modes.

53. A method of facilitating the educational development of a learner comprising the step of: providing executable instructions via the Internet to a digital processing device comprising a processor and an operating system configured to perform executable instructions to create a web-based educational environment for a learner, the educational environment comprising: at least one area of skill, interest, or expertise; a plurality of activities associated with each area of skill, interest, or expertise; and, at least three navigational modes comprising:
   (a) a sequenced navigational mode wherein said web-based educational system presents to the learner a predetermined sequence of more than one activity in one or more areas of skill, interest, or expertise wherein the learner must complete each preceding activity in the sequence to progress to the next;
   (b) a guided navigational mode wherein said web-based educational system presents to the learner one or more activities in one or more areas of skill, interest, or expertise selected by a human mentor from among a population of activities to create a subpopulation of activities; optionally, the learner selects activities from among said subpopulation of activities;
   (c) an independent navigational mode wherein said web-based educational system presents navigational elements to allow the learner to select activities from among a population of activities; and
   (d) optionally, the educational environment provides the learner with the ability to switch between said navigational modes;

whereby the educational development of the learner is furthered in the at least one area of skill, interest, or expertise.

* * * * *